(12) United States Patent
Barak et al.

(10) Patent No.: US 9,760,909 B2
(45) Date of Patent: *Sep. 12, 2017

(54) SYSTEMS AND METHODS FOR GENERATING LEAD INTELLIGENCE

(71) Applicant: Marketo, Inc., San Mateo, CA (US)

(72) Inventors: Erez Barak, Kirkland, WA (US); Brian Scott Goffman, Mercer Island, WA (US)

(73) Assignee: Marketo, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/335,035

(22) Filed: Oct. 26, 2016

(65) Prior Publication Data

US 2017/0046739 A1   Feb. 16, 2017

Related U.S. Application Data

(63) Continuation of application No. 13/777,977, filed on Feb. 26, 2013, now Pat. No. 9,552,591, which is a (Continued)

(51) Int. Cl.
*G06Q 10/00* (2012.01)
*G06Q 30/02* (2012.01)
*H04L 29/08* (2006.01)

(52) U.S. Cl.
CPC ......... *G06Q 30/0255* (2013.01); *G06Q 30/02* (2013.01); *G06Q 30/0201* (2013.01); *H04L 67/10* (2013.01); *H04L 67/22* (2013.01)

(58) Field of Classification Search
CPC .................................. G06Q 30/0255
(Continued)

(56) References Cited

U.S. PATENT DOCUMENTS 7,240,022 B1   7/2007   Bistriceanu et al.
7,539,697 B1   5/2009   Akella et al.
(Continued)

OTHER PUBLICATIONS

"B2B Marketing Firm Marketo Announces Development of New Marketing Automation Platform Leveraging Salesforce.com's Force.com Platform." PR Newswire, Sep. 17, 2007. 2 pages.
(Continued)

*Primary Examiner* — Susanna M Meinecke Diaz
(74) *Attorney, Agent, or Firm* — Mahamedi IP Law LLP

(57) ABSTRACT

Techniques for generating marketing lead intelligence information are described. Some embodiments provide a marketing activity support system ("MASS") configured to generate lead intelligence by aggregating marketing activity information and customer information. In one embodiment, the MASS transmits a marketing message that references a Web page or other marketing content. Next, the MASS receives tracking information about activities of a customer with respect to the referenced Web page. The MASS then generates lead intelligence information about the customer by aggregating the tracking information, personal information about the customer, and/or information about an associated marketing campaign. The MASS may then present the generated lead intelligence information, such as by displaying details about the customer and their activities with respect to the Web page.

16 Claims, 15 Drawing Sheets

Related U.S. Application Data continuation of application No. 12/760,329, filed on Apr. 14, 2010, now abandoned.

(58) Field of Classification Search
USPC .................................................. 705/7.29
See application file for complete search history.

(56) References Cited

U.S. PATENT DOCUMENTS

| | | |
|---|---|---|
| 7,669,136 B1 | 2/2010 | Gaware |
| 2007/0136415 A1 | 6/2007 | Behl et al. |
| 2007/0185986 A1 | 8/2007 | Griffin et al. |
| 2007/0255614 A1* | 11/2007 | Ourednik ............... G06Q 10/10 705/7.19 |
| 2008/0126318 A1* | 5/2008 | Frankovitz ........ G06F 17/30864 |
| 2008/0275849 A1 | 11/2008 | Basu et al. |
| 2008/0288325 A1* | 11/2008 | Pavlov ................... G06Q 30/02 705/14.54 |
| 2008/0313011 A1 | 12/2008 | Rose et al. |
| 2009/0017804 A1* | 1/2009 | Sarukkai ................ G06Q 30/02 455/414.3 |
| 2009/0017827 A1 | 1/2009 | Perry et al. |
| 2009/0048859 A1* | 2/2009 | McCarthy .......... G06Q 30/0281 705/346 |
| 2009/0119173 A1 | 5/2009 | Parsons et al. |
| 2009/0254459 A1 | 10/2009 | Williams et al. |
| 2009/0271730 A1 | 10/2009 | Rose et al. |
| 2009/0287713 A1 | 11/2009 | Anderson et al. |
| 2010/0070876 A1 | 3/2010 | Jain et al. |
| 2011/0145628 A1 | 6/2011 | Wilson |
| 2011/0246457 A1* | 10/2011 | Dong ..................... G06Q 10/06 707/725 |
| 2011/0251895 A1* | 10/2011 | Bladel ............... G06F 17/30882 705/14.54 |

OTHER PUBLICATIONS

"Marketo Unveils New Enterprose Architecture for Marketing Automation." Newswire, Mar. 29, 2010. p. 2.

\* cited by examiner

SYSTEMS AND METHODS FOR GENERATING LEAD INTELLIGENCE

CROSS-REFERENCE TO RELATED APPLICATIONS

This application is a continuation of U.S. patent application Ser. No. 13/777,977 filed Feb. 26, 2013, which is a continuation of U.S. patent application Ser. No. 12/760,329 filed Apr. 14, 2010, which applications are hereby incorporated by reference for all purposes.

TECHNICAL FIELD

The present disclosure relates to techniques for facilitating marketing campaigns and, in particular, to methods, systems, and techniques for generating lead intelligence information based on user activity tracking information.

DETAILED DESCRIPTION

Embodiments described herein provide enhanced computer- and network-based methods and systems for supporting marketing activities. Example embodiments provide a marketing activity support system ("MASS") configured to generate lead intelligence, for example for sales, marketing, product support, client identification, research purposes, and the like. Lead intelligence is based on an aggregation of marketing activity information and user (e.g., customer) information. Marketing activity information includes information about marketing activities performed with or by the MASS, such as marketing campaign management activities (e.g., campaign creation), marketing messaging activities (e.g., a message or advertisement transmitted to or received by a customer), and the like. User information includes information about customers (e.g., personal information, company information) and their activities in response to marketing messages received from the MASS, such as tracking information that reflects Web site accesses, Web site-drive action, or other actions performed by one or more customers.

Figure 1:
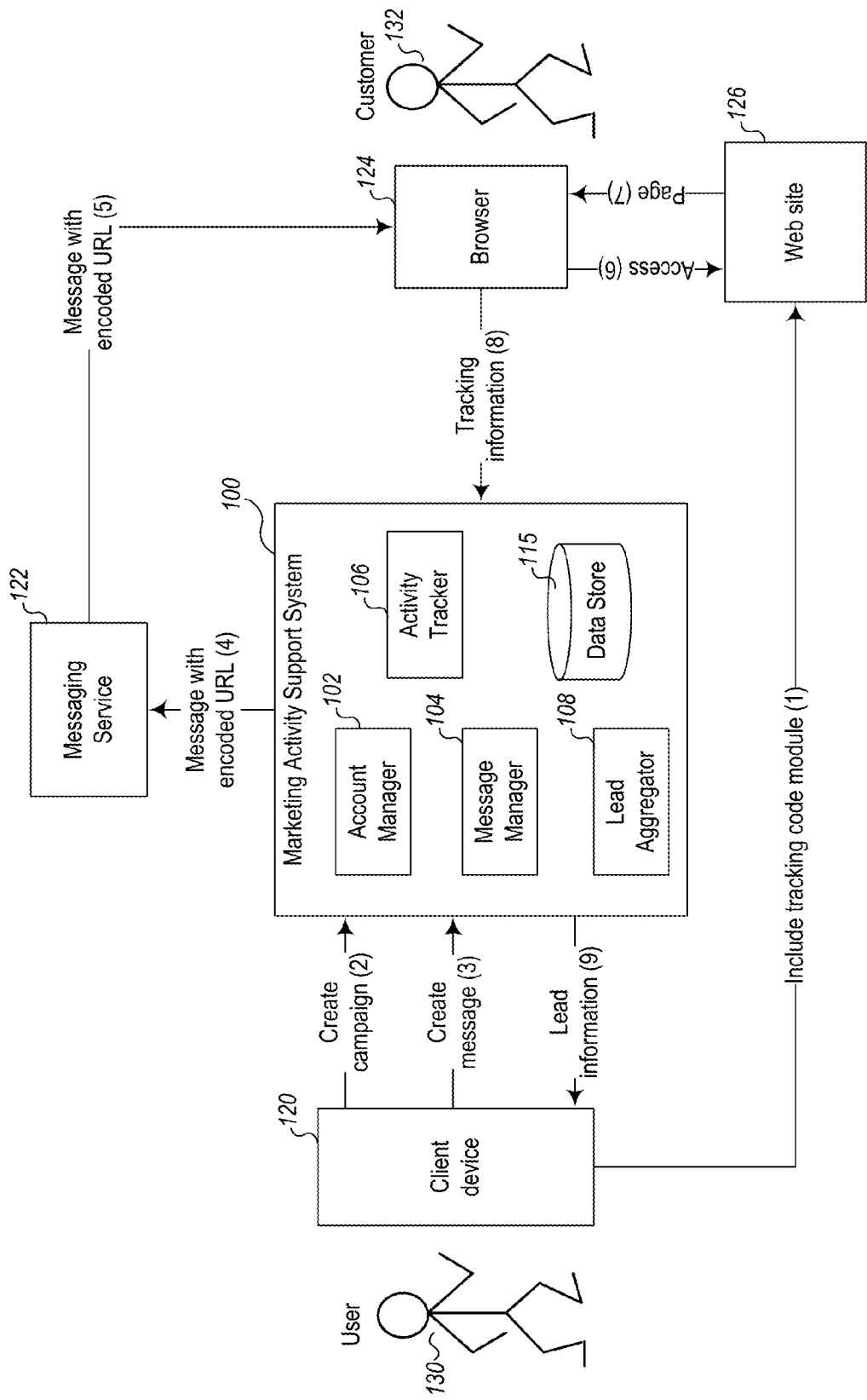
FIG. 1 illustrates an example block diagram of an example embodiment of a marketing activity support system.

FIG. 1 illustrates an example block diagram of an example embodiment of a marketing activity support system. In particular, FIG. 1 illustrates a marketing activity support system ("MASS") 100 that includes an account manager 102, a message manager 104, an activity tracker 106, a lead aggregator 108, and a data store 115.

As an overview of the operation of an example embodiment, a user 130 (e.g., sales representative, marketing agent, researcher, advertiser, Web site owner, Web site operator, online agency) utilizes the MASS 100 to manage a marketing campaign. As part of the campaign, the user 130 may create and transmit a marketing message via a messaging service 122. The message may be transmitted via a variety of mechanisms, including a direct (e.g., one to one) messaging service, such as email, or a broadcast messaging service, such as a blog post. The transmitted message references an advertising or marketing resource, such as by including a uniform resource locator ("URL") that identifies a Web page or other content or resource (e.g., video, audio clip, application) hosted or otherwise provided by a Web site 126. The Web page/resource identified by the URL provides information about a product or service to a potential or existing customer 132. Prior to transmitting the marketing message, the MASS 100 may automatically modify the URL to include one or more tracking identifiers. Tracking identifiers include any names, keys, and/or values which may be specific to the recipient/consumer of the message, the marketing campaign, the message, or other entity that is involved in the marketing campaign. The MASS 100 transmits the marketing message via a messaging service 122. Later, the MASS 100 receives an indication that the Web page was accessed by the customer 132 via the URL of the transmitted message. Then, the MASS 100 can generate lead intelligence information by aggregating (e.g., aligning, combining, integrating) the received indication with information about the user that accessed the Web page and/or information about the marketing campaign or message. The MASS 100 then provides the generated lead intelligence to the user 130.

More specifically, the user 130 uses the MASS 100 to perform marketing activities, such as creating marketing campaigns, transmitting marketing messages, and determining the effectiveness of various marketing activities. Marketing effectiveness may be determined and understood in various ways, including based on visits and leads to one or more Web sites, as well as how such activities relate to a user's behavioral patterns on the Web site. In the illustrated embodiment, the user 130 operates a client device 120 (e.g., a desktop computer or a mobile device executing a Web browser and/or other client software) to initially include a tracking code module in the Web site 126 (activity (1)). The tracking code module facilitates the tracking of customer activities with respect to the Web site 126, as will be explained further below. Typically, the tracking code module is provided by the MASS 100, although in other embodiments it can be obtained from other sources.

Then, the user 130 utilizes (via the client device 120) the account manager 102 of the MASS 100 to create a marketing campaign (activity (2)). A marketing campaign may include a plan to promote a product or service (e.g., a webinar) via some set of marketing activities. In the illustrated embodiment, the account manager 102 can represent multiple campaigns and store them in the data store 115, such that the user 130 can manage and obtain information about each of the multiple campaigns, such as relative effectiveness, cost, generated leads, and the like.

Next, the user 130 utilizes the message manager 104 of the MASS 100 to create a message for the campaign (activity (3)). The message manager 104 may store the created message and related information in the data store 115. In this example, the user creates a message that includes a URL that identifies a specific page or other resource on the Web site 126, which in turn provides additional information and/or services related to a particular marketing campaign. For example, if the marketing campaign is to promote a new kitchen product, the message may announce the new product and provide a link (e.g., via the URL) to the Web site 126, where a recipient (e.g., customer 132) of the message can obtain additional information about the product, sign up for a mailing list to receive announcements about the product, request a sample of the product, purchase the product, or the like.

After the user 130 creates the message, the message manager 104 automatically modifies the URL of the message to include one or more tracking identifiers. Modifying the URL may include encoding the tracking identifiers in the URL. The included tracking identifiers indicate or are otherwise associated with the user 130, the campaign, and/or other information (e.g., the messaging service used) that can be used later to associate use of the URL back to the user 130 and/or one or more of his campaigns. In some cases, the message manager 104 may also modify the URL in other ways, such as to conform to technical restrictions or limits (e.g., maximum message size) placed on messaging capabilities by the messaging service 122. The message manager 104 performs these operations in a manner that is transparent to the user 130, such that the user 130 need not manually modify or otherwise perform manual and possibly error prone URL surgery.

The message manager 104 then transmits the message including the modified URL to the messaging service 122 (activity (4)). The messaging service 122 may be a direct messaging service, such as email, where at least some information (e.g., email address) about the message recipient is known at transmission time. In other cases, the messaging service 122 may be a broadcast messaging service, such as a blog and/or social networking post (e.g., Twitter, Facebook), where the identity of potential recipients is typically not known at the time of message transmission. In such cases the MASS 100 can make known the identities of recipient customer who would otherwise not be known to the user 130.

The customer 132 receives the message via a browser 124 or other client component (e.g., email reader), device (e.g., smart phone), or system (e.g., activity (5)). If the customer 132 is interested in learning more about the product promoted by the received message, the customer 132 may activate or select (e.g., click on) the included URL to access the Web page or other resource identified by the URL (activity (6)). In turn, the Web site 126 provides the requested page to the browser 124, where it is rendered and presented to the customer 132 (activity (7)).

Recall that a tracking code module was included in the Web site 126. In one embodiment, this tracking code module is a client side script that executes within the context of the browser 124 when the Web page identified by the message URL is loaded and/or rendered for display. The client side script gathers tracking information, including the one or more tracking identifiers that are encoded in the URL, as well as other information about the activities and/or identity of the customer 132. Then, the client side script transmits the tracking information back to the MASS 100 (activity (8)), where it is recorded by the activity tracker 106 in the data store 115. This is done with minimal effect to existing page performance. The script may also send data previously stored about the user using HTTP browser cookies or other tracking technologies.

The lead aggregator 108 generates lead intelligence by aggregating (e.g., aligning, combining) information stored in the data store 115, including the tracking information stored by the activity tracker 106, campaign information stored by the account manager 102, messages created by the message manager 104, and the like. In some embodiments, the tracking information may include data from one or more Web forms filled out by the customer 132. These Web forms typically ask the customer 132 to provide some personal information in exchange for information, products, or services desired by the customer 132. For example, the customer 132 may provide his email address and/or other personal information to receive updates about a product launch, a product white paper, a product sample, a developer key, a pre-release version of a product, or the like. In addition, the lead aggregator 108 may align local information (e.g., campaign information) with other information obtained from external information sources, such as business intelligence services, directory services (e.g., White pages, Yellow pages, business directories), search engines, news services, social networking information, and the like. By aggregating data obtained from various internal and external sources, the lead aggregator 108 can create a relatively complete profile of the customer 132, even though the customer 132 may have only provided minimal information about himself. The profile may include personal information about the customer 132, as well as information about the activities of the customer 132 with respect to the Web site 126 and/or the received message.

The lead aggregator 108 may also score, order, or otherwise rank generated lead intelligence, based on various factors, such as company information (e.g., company name, industry), personal information (e.g., user name, city), Web page traffic (e.g., page views, visit duration). Real time lead scoring is described in more detail with reference to FIGS. 2J-2L, below.

After generating lead intelligence as discussed above, the MASS 100 provides the generated lead intelligence information to the client device 120 (activity (9)). The client device 120 may then display, such as in the context of a Web browser, the generated lead intelligence for study or consumption by the user 130. In other embodiments, the generated lead intelligence may be provided to other entities, including third-party systems, possibly in exchange for a fee.

The data store 115 is generally used to store or record information used by components of the MASS 100, including account information (e.g., user accounts authorized to utilize the MASS 100), campaign information, message information, activity information, and lead intelligence information.

The described techniques herein are not limited to the specific architecture shown in FIG. 1. For example, in some embodiments, some functions such as activity tracking are performed by another (possibly external or remote) system or component. In other embodiments, the MASS 100 may not interact directly with users, but rather provide user interface components (e.g., plug-ins or widgets) that may be embedded or otherwise incorporated in third-party applications or systems, such as Web sites, smart phones, desktop systems, and the like. In further embodiments, the MASS 100 may provide an application program interface, such that external programs can programmatically interact with or invoke functions of the MASS 100.

In addition, although the described techniques for generating lead intelligence information are illustrated primarily with respect to customers or potential customers, other types of users are contemplated, including existing or potential clients, viewers, readers, subscribers, consumers, donors, or the like. Furthermore, although the described techniques are illustrated with respect to textual Web pages and marketing messages, other forms of marketing content are contemplated, including any network-accessible resources, such as audio, images, and/or video, as well as active or interactive content such as interactive applications (e.g., code modules, programs, online applications, smart phone applications), games, and the like.

FIGS. 2A-2L illustrate example screen displays provided by an example embodiment of a marketing activity support system. In the illustrated example, the screen displays are presented by a Web browser interacting with the MASS and executing on a client device, such as a desktop computing system. Variations on the illustrated screen displays are contemplated, including other user interface elements, more or less information, different orders of presentation, and the like. In one embodiment, a "mobile" version of at least some of the illustrated screens is provided by the MASS, such that users of smart phones or other limited display devices can access at least some of the functions of the MASS.

Figure 2A:
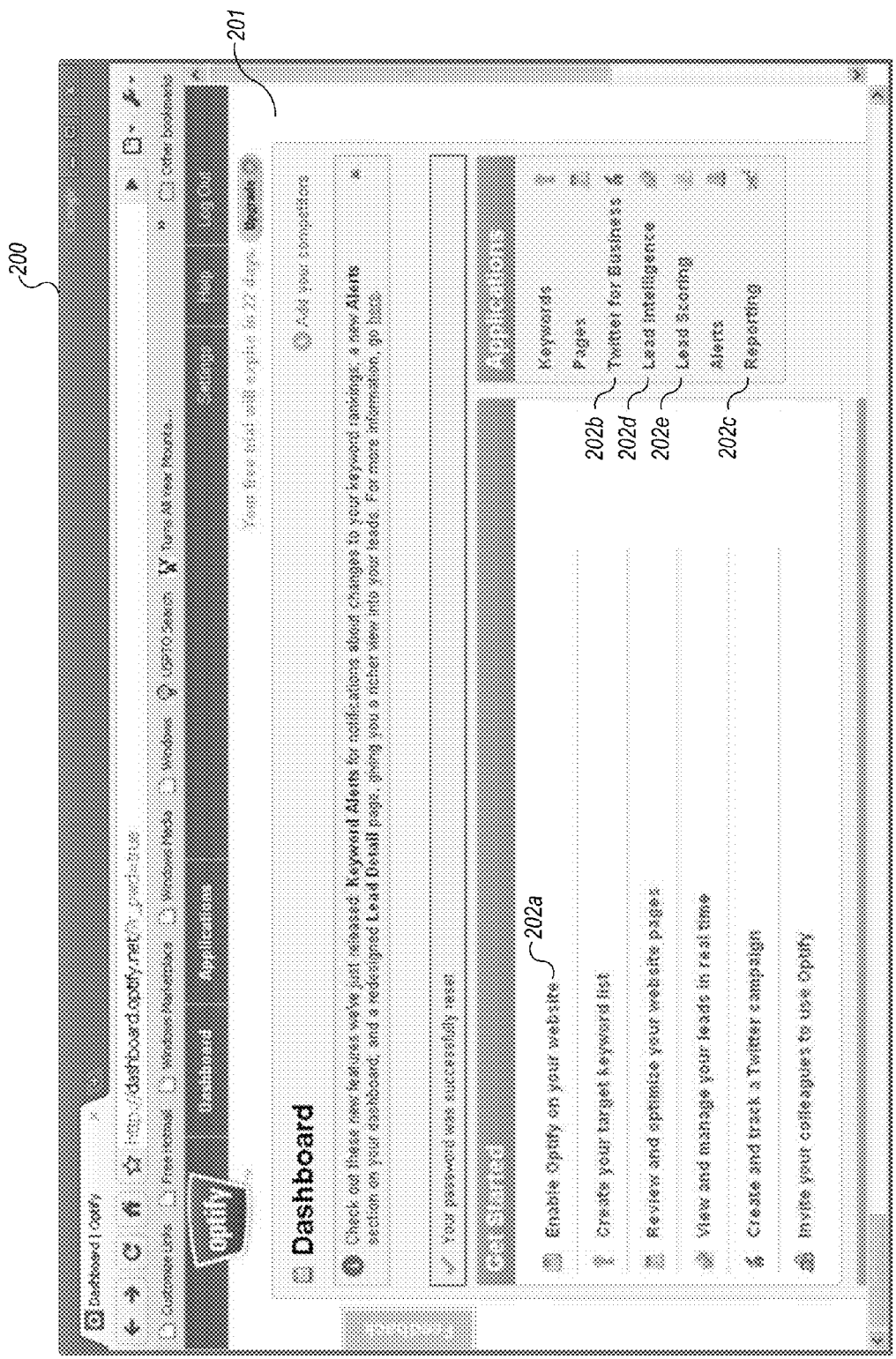
FIGS. 2A-2L illustrate example screen displays provided by an example embodiment of a marketing activity support system.

FIG. 2A illustrates an example main page or "dashboard" provided by an example embodiment of a marketing activity support system. In particular, FIG. 2A illustrates a Web browser 200 that displays a screen 201 (e.g., a Web page) that is being used by a user to interact with the marketing activity support system. The screen 201 includes multiple user-selectable controls 202 (e.g., links, buttons) that provide access to various functions of the MASS. In particular, the screen 201 includes a control 202a for enabling activity tracking via the MASS, as will be described with reference to FIGS. 2B and 2C, below. The screen 201 also includes a control 202b for managing marketing messages, as will be described with reference to FIGS. 2D-2H, below. The screen 201 further includes a control 202c for accessing an activity report, as will be described with reference to FIG. 2I, below. The screen 201 also includes a control 202d for accessing a lead and visitor intelligence report, as will be described with reference to FIGS. 2J and 2K, below. The screen 201 also includes a control 202e for accessing and controlling lead scoring functions of the MASS, as will be described with reference to FIG. 2L, below.

Figure 2B:
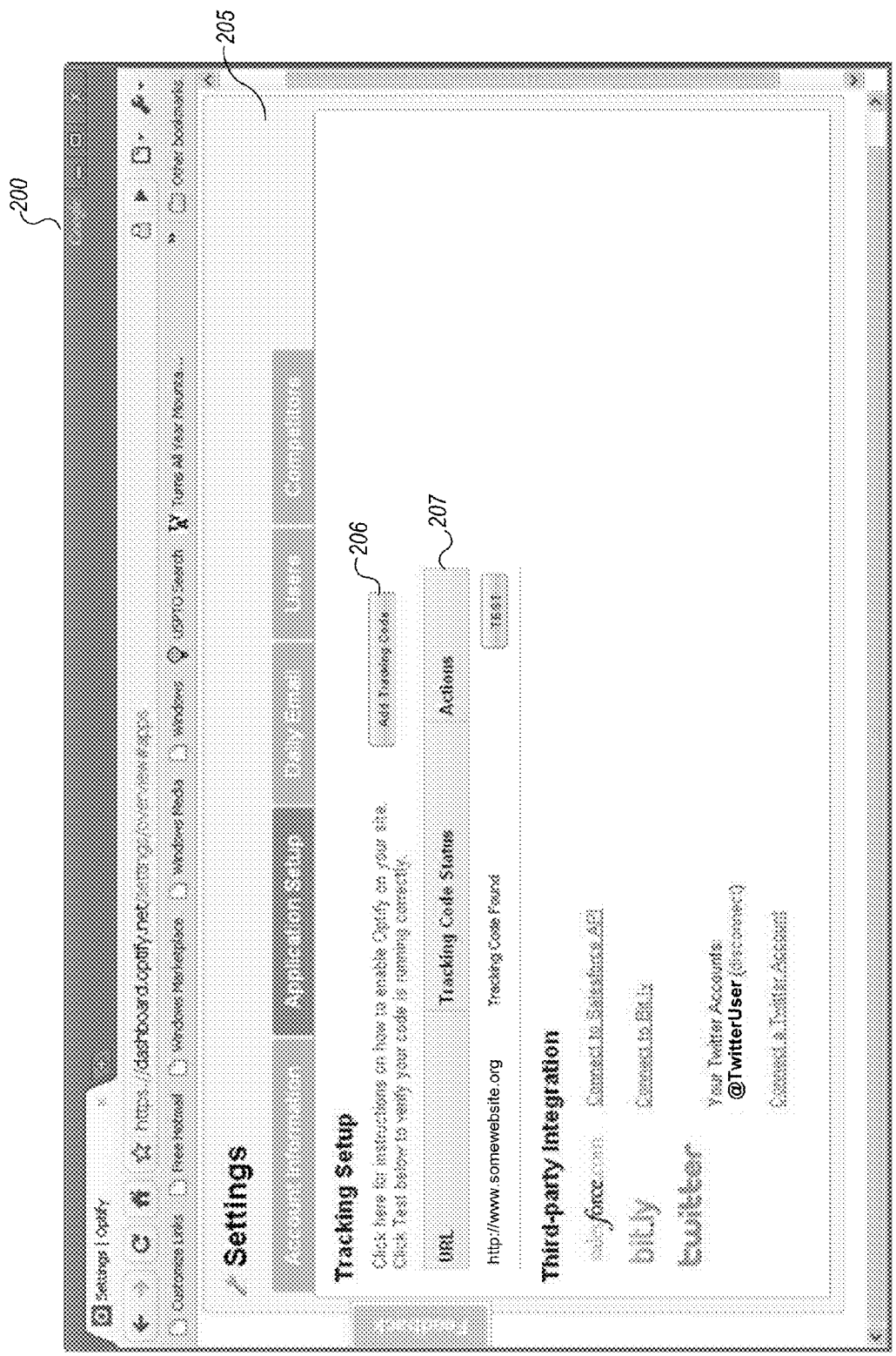

FIG. 2B illustrates an example activity tracking setup page. In particular, FIG. 2B illustrates the Web browser 200 displaying a screen 205 that is being used by a user to set up Web site activity tracking via the MASS. The screen 205 includes an "add tracking code" control 206 and a tracking status information section 207. The add tracking code control 206, when selected, causes the MASS to provide a tracking code module as described with reference to FIG. 2C, below. The tracking status information section 207 provides tracking status information (e.g., whether the tracking code was successfully installed) for one or more Web sites or pages that are being tracked via the MASS. In the illustrated example, the user is tracking a Web site identified by the URL http://www.somewebsite.org/.

Figure 2C:
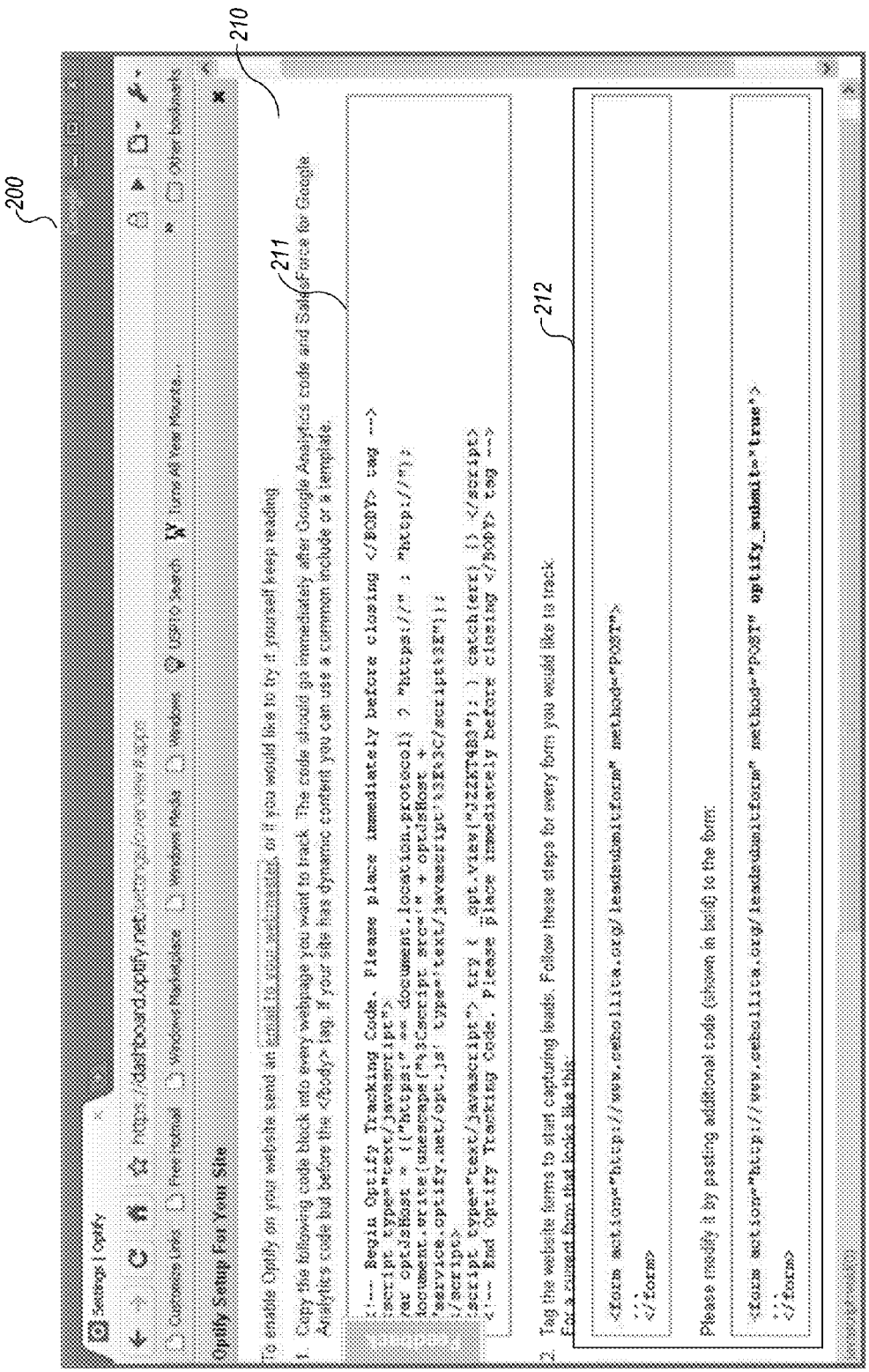

FIG. 2C illustrates an example code module used for activity tracking. In particular, FIG. 2C illustrates the Web browser 200 displaying a screen 210 that provides an activity tracker loader code module 211. The code module 211 can be added (e.g., by copy-pasting the provided source code) to one or more pages of a Web site for which the user desires customer activity tracking. The code module 211 operates as a loader, in that it causes an executing Web browser to load an activity tracker code module and execute it without further intervention from the Web site user.

An example of an activity tracker code module is provided with reference to Appendix A, which is incorporated herein by reference in its entirety. The activity tracker of Appendix A performs various tracking functions, including causing an executing Web browser to load a small (e.g., single pixel) transparent image from a tracking host. In the process, an HTTP/S cookie is transferred to the tracking host. The transferred HTTP/S cookie includes name value pairs which include tracking information such as indications of the current Web page (e.g., URL including any parameters), referring Web page, time and date, user information, and the like.

The screen 210 of FIG. 2C also includes instructions 212 for modifying Web site forms to enable the activity tracker to transmit information from those forms to the tracking host. In particular, by modifying the form fields as described, the activity tracker can obtain form field information filled in by a potential customer (e.g., name, company identifiers, contact information), and transmit the obtained information to the tracking host.

Figure 2D:
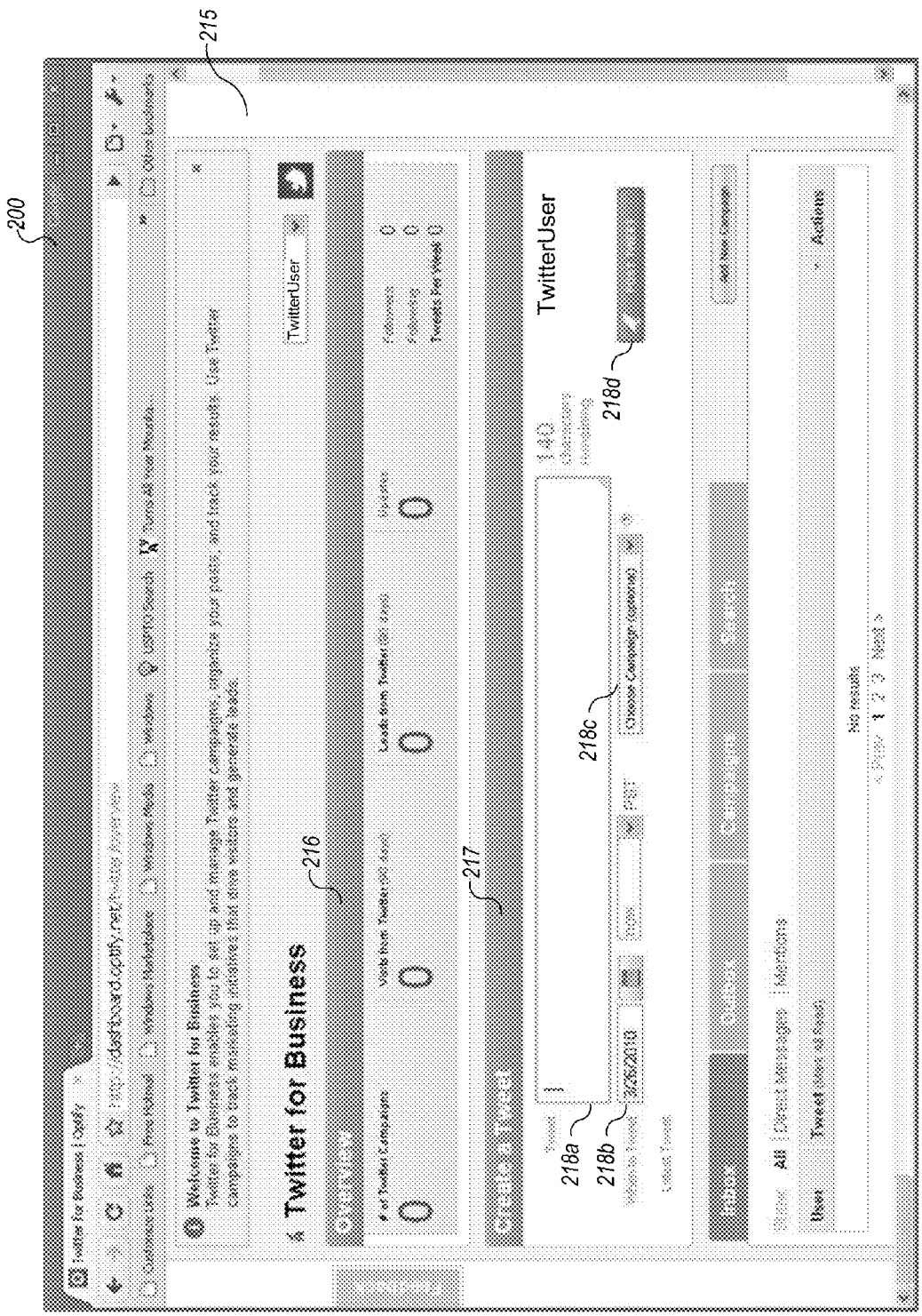

FIG. 2D illustrates an example marketing message management page. In particular, FIG. 2D illustrates the Web browser 200 displaying a screen 215 that is being used by a user to create and send marketing messages via a broadcast or direct (one-to-one) mechanism. In this example, the screen 215 provides user interface controls for sending messages via one messaging service, in this case, the Twitter micro-blogging service. The Twitter micro-blogging service is an example of a broadcast messaging service, in that the number and identity of recipients of the messages sent via the service are not known. The screen 215 includes a campaign information overview section 216 and a message creation section 217. Section 216 presents (e.g., highlights) summary information about marketing campaigns created or managed by the user, such as the number of marketing campaigns, the number of visitors received via the Twitter messaging service, the number of leads received via the Twitter messaging service, and the like. Section 217 includes controls 218 for managing a message (a Tweet), including a message box 218a for editing the message, a date-time selector 218b for specifying a date and time to transmit the message, a campaign selector 218c for specifying a marketing campaign associated with the message, and a button 218d for initiating transmission of the message.

Figure 2E:
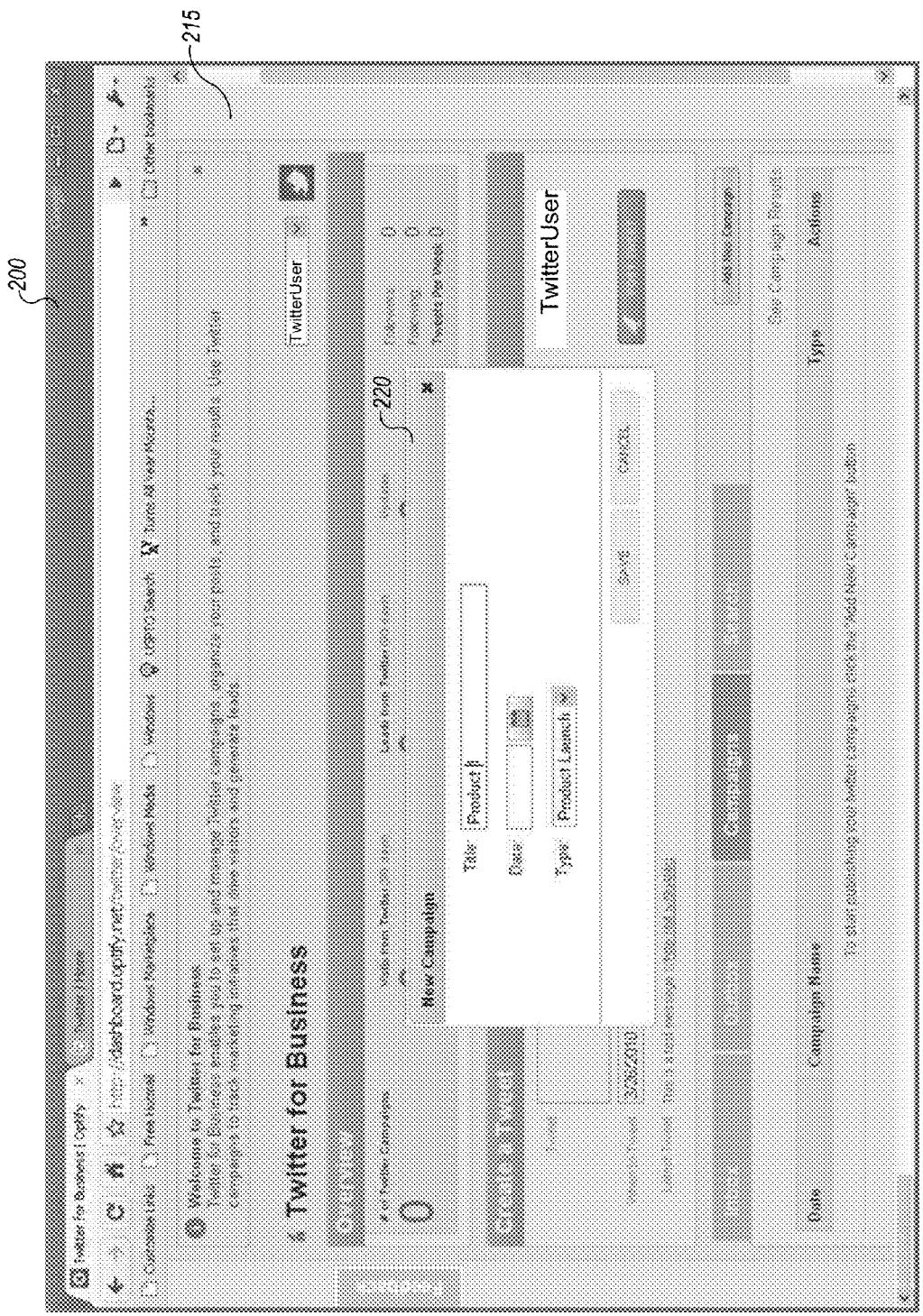

FIG. 2E illustrates the creation of an example marketing campaign. In particular, FIG. 2E illustrates the Web browser 200 displaying the screen 215 during creation of a new marketing campaign. Here, screen 215 includes a popup 220 that is displayed in response to a selection made via the campaign selector 218c described with reference to FIG. 2D, above. The popup 220 includes controls that can be utilized by the user to create a new campaign by specifying a campaign name (e.g., "Product 1"), date, and type (e.g., "Product Launch").

Figure 2F:
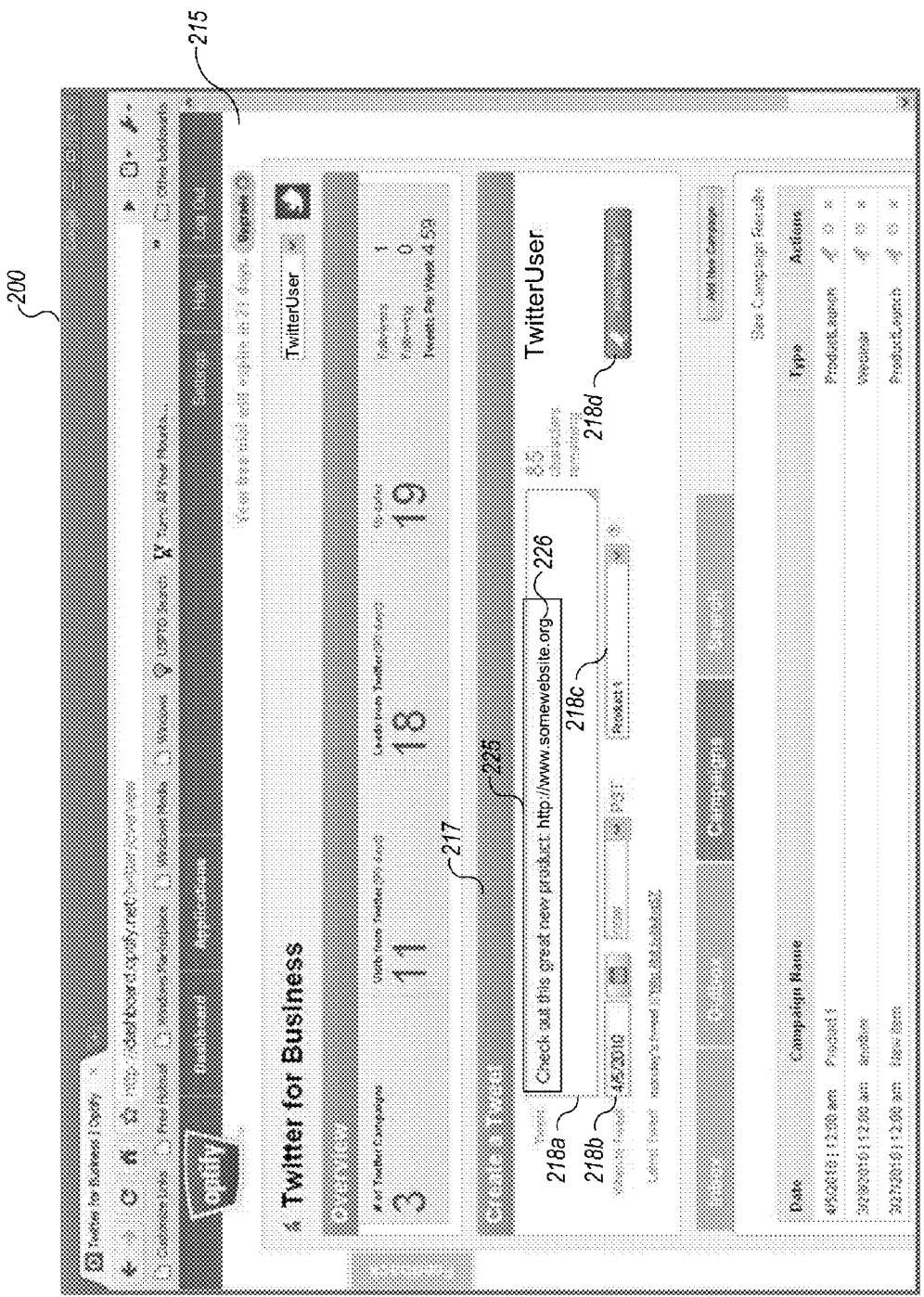

FIG. 2F illustrates the creation of an example marketing message. In particular, FIG. 2F illustrates the Web browser 200 displaying the screen 215 during the creation of a new marketing message to be sent by the MASS. Here, the user has created a new campaign ("Product 1") as described with reference to FIG. 2E, above, and selected that campaign via selector 218c. Then, the user has entered a message 225 into the message box 218a. The message 225 reads "Check out this great new product: http://www.somewebsite.org." Note that the message 225 includes a URL 226 that identifies a Web page that provides additional information about the advertised product. Once the user is satisfied with the content of message 225, the user selects button 218d and initiates transmission of the message via an associated account (having a username of "TwitterUser") on the Twitter micro-blogging service. Typically, the company or organization that is performing the marketing services described herein would have a Twitter account used for posting messages of this sort. In other cases, marketing messages may be posted by, or with the permission of, famous persons (e.g., celebrities, movie stars, musicians) to promote brands, goods, or services that they are associated with or otherwise wish to promote.

Note that the MASS can manage multiple different message service accounts for a particular user. For example, for a single user, the MASS can store account credentials for an email service, a blog service, a Web site administration/posting account, and the like. Furthermore, multiple distinct users can be associated with a single MASS management account. For example, users A and B may both be associated with a MASS user account, such that each user can perform some or all operations associated with the user account (e.g., campaign creation, message transmission). In at least some embodiments, the MASS may provide fine-grained control over privileges, such that different users can be provided with different levels of access to the MASS. For example, one user may be provided with full control, whereas another user may be provided only with access to view lead intelligence reports (and not to send marketing messages).

Note that although the management of marketing messages is here described with respect to the Twitter microblogging service, use of other messaging (e.g., one-to-one and/or broadcast in nature) services is contemplated. In some embodiments, other or additional broadcast messaging services may be utilized, including social network status updates (e.g., a Facebook status update), news feeds (e.g., RSS), Internet news (e.g., NNTP), Web pages, blogs, and the like. In other embodiments, other or additional direct messaging services may be utilized, including email, instant messaging, text messaging (e.g., SMS, MMS), and the like.

Figure 2G:
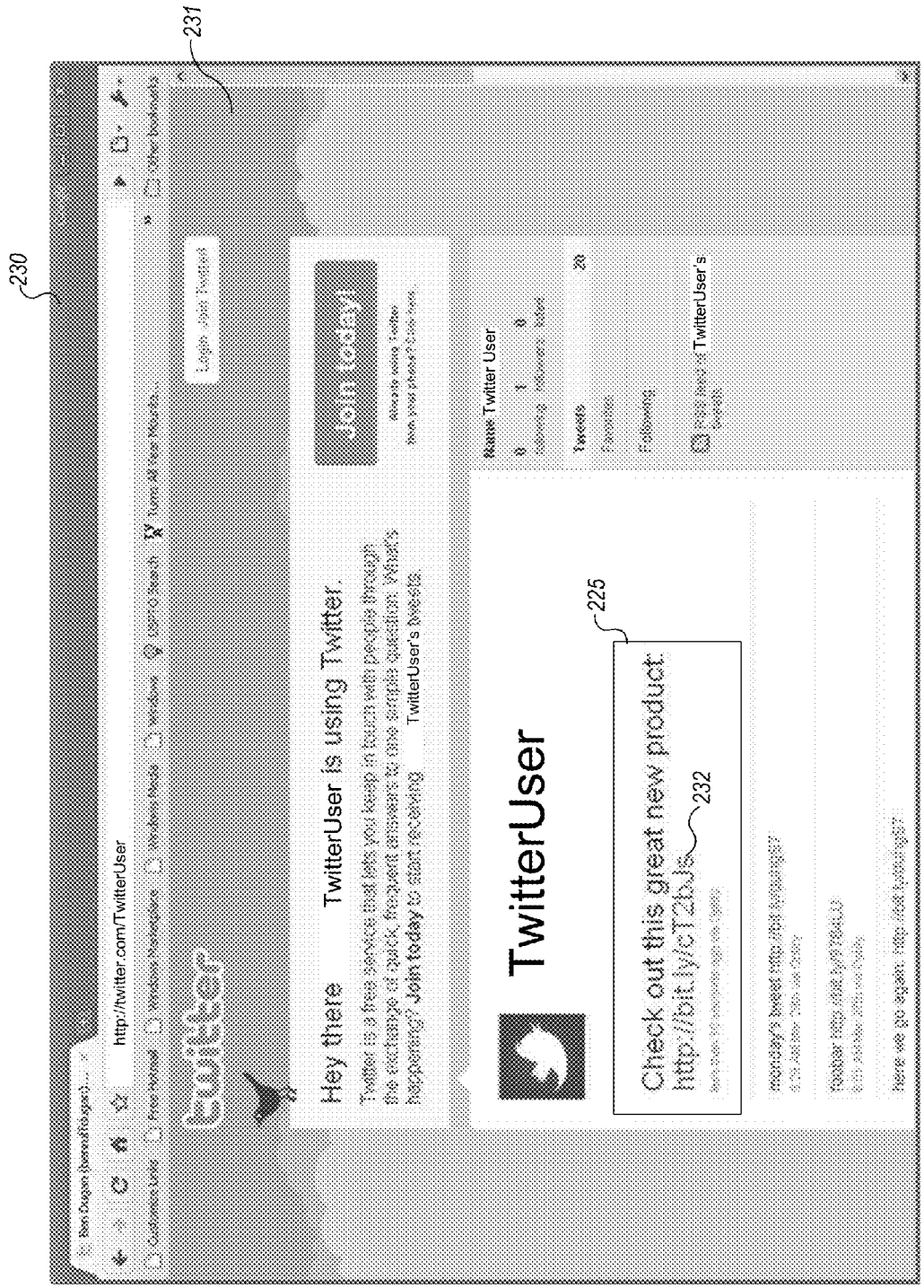

FIG. 2G illustrates an example client displaying the example marketing message of FIG. 2F. In particular, FIG. 2G illustrates a Web browser 230 displaying a screen 231. The Web browser 230 is operated by a customer or potential customer who is viewing Twitter messages posted under an account having a username of TwitterUser. In particular, the screen 231 displays the message 225 created and transmitted as described with reference to FIG. 2F, above. Note that the message here includes a URL 232 ("http://bit.ly/cT2bJs") that is different from the URL 226 (FIG. 2F) originally included in the message 225. Prior to transmitting the message 225, the MASS first modified the URL to include tracking identifiers, and then used a URL shortening service to shorten the resulting URL in order to reduce the length of the URL such that it can still be transmitted within the fixed character (e.g., 140 characters) limit of the Twitter messaging service. In this manner, the MASS can include (albeit indirectly) an arbitrary amount of tracking information in the transmitted URL without concern for data size restriction imposed by the underlying messaging service.

Figure 2H:
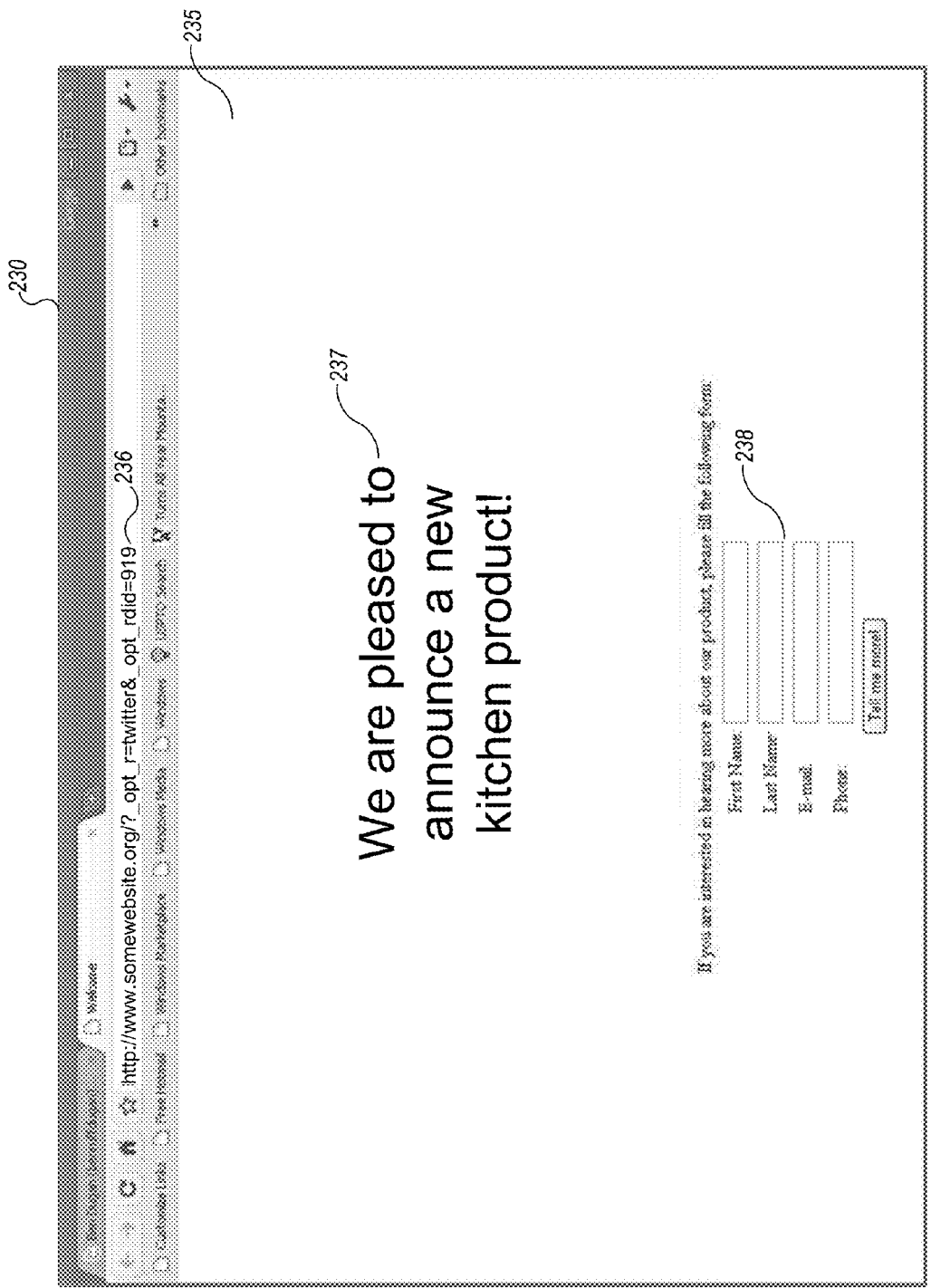

FIG. 2H illustrates an example page identified by a URL in an example marketing message. In particular, FIG. 2H illustrates the Web browser 230 displaying a screen 235 presented in response to the customer's selection of the URL 232 described with reference to FIG. 2G. The shortened URL 232 of FIG. 2G, when selected by the customer, is redirected through the URL shortening service (as specified in the URL 232) to a URL 236 ("http://www.somewebsite.org/"?_opt_r=twitter&_opt_rdid=919"), which is the original URL 226 (FIG. 2F) modified to include tracking identifiers added by the MASS, in this case "?_opt_r=twitter&_opt_rdid=919." These tracking identifiers identify the messaging service ("_opt_r=twitter") and the associated marketing campaign ("_opt_rdid=919"). Other tracking identifiers may be included, such as a message identifier (e.g., to distinguish identical messages sent at different times), a user identifier (e.g., of the user who sent the message), or the like. The included tracking identifiers are unique to the MASS and may be used in conjunction with other HTTP/S parameters.

The screen 235 includes product information 237 and a customer intake form 238. The product information 237 provides information about the product advertised via the message 225. The customer intake form 238 can be used by the customer to provide personal information in exchange for receiving product updates, customer service contacts, or the like.

When the browser 230 loads and renders the content of the URL 236 to generate the screen 235, the browser 230 executes the activity tracker as described with reference to FIG. 2C and Appendix A. The activity tracker transmits tracking information back to the MASS, including the tracking identifiers of the URL 236, referrer information (e.g., the Twitter page described with reference to FIG. 2G), customer information (e.g., information provided by the customer via form 238), and the like.

Figure 2I:
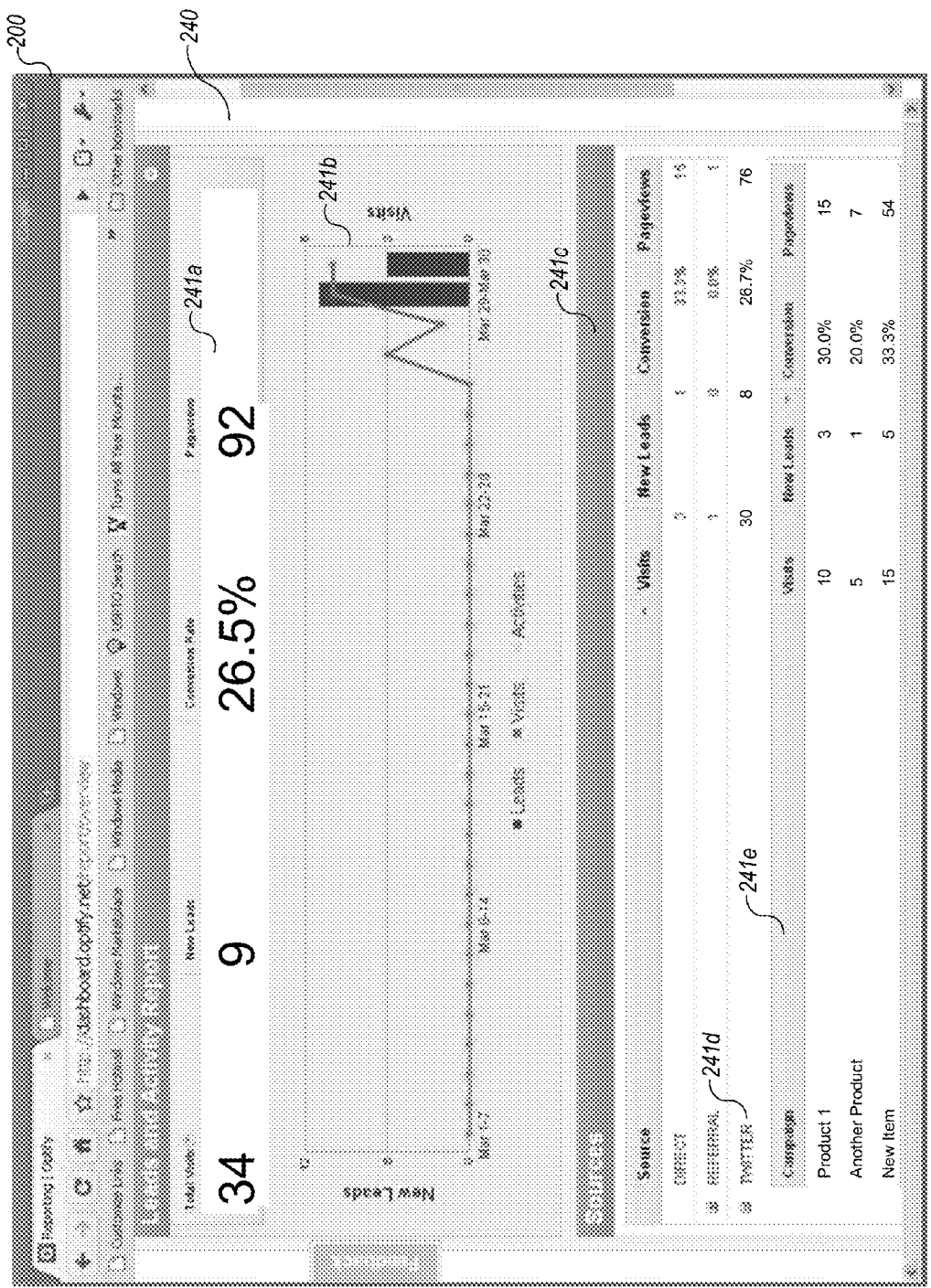

FIG. 2I illustrates an example overview activity report. In particular, FIG. 2I illustrates the Web browser 200 displaying a screen 240 that presents overview activity information. The screen 240 includes a summary section 241a that presents aggregate information about customer activities, including total visits (34) to Web sites promoted via marketing messages and/or tracked by the MASS, new leads generated (9), a conversion rate of new visitors to leads (26.5%), and total page views (92). The screen 240 also includes a graph 241b which plots leads and visits over time. The screen 240 further includes a messaging service section 241c which breaks out customer visits by messaging service and campaign. For example, the section 241c includes a Twitter section 241d which presents the visits, leads, conversion rate, and page views generated by Twitter messages transmitted via the MASS. The Twitter section 214d can be further expanded to show campaign section 241e which presents visits, leads, conversion rate, and page views generated by Twitter messages associated with particular campaigns (e.g., "Product 1," "Another Product," and "New Item").

Figure 2J:

FIG. 2J illustrates an example lead intelligence report. In particular, FIG. 2J illustrates the Web browser 200 displaying a screen 245 that presents detailed marketing lead information. In particular, the screen 245 includes a lead summary section 246 and a lead information section 247. The lead summary section 246 presents summary information about leads generated via the MASS, including total visitors, total leads generated, a conversion rate of visitors to leads, and an average lead score. The lead information section 247 presents information about each generated lead, including last visit date and time, name, company, lead score, referral type (e.g., the messaging service via which the lead's visit was generated), total visits, and the like. By selecting one of the presented leads, the user can obtain a lead detail report, described next. Note that in other embodiments, other, different, more, or less information may be presented.

Figure 2K:
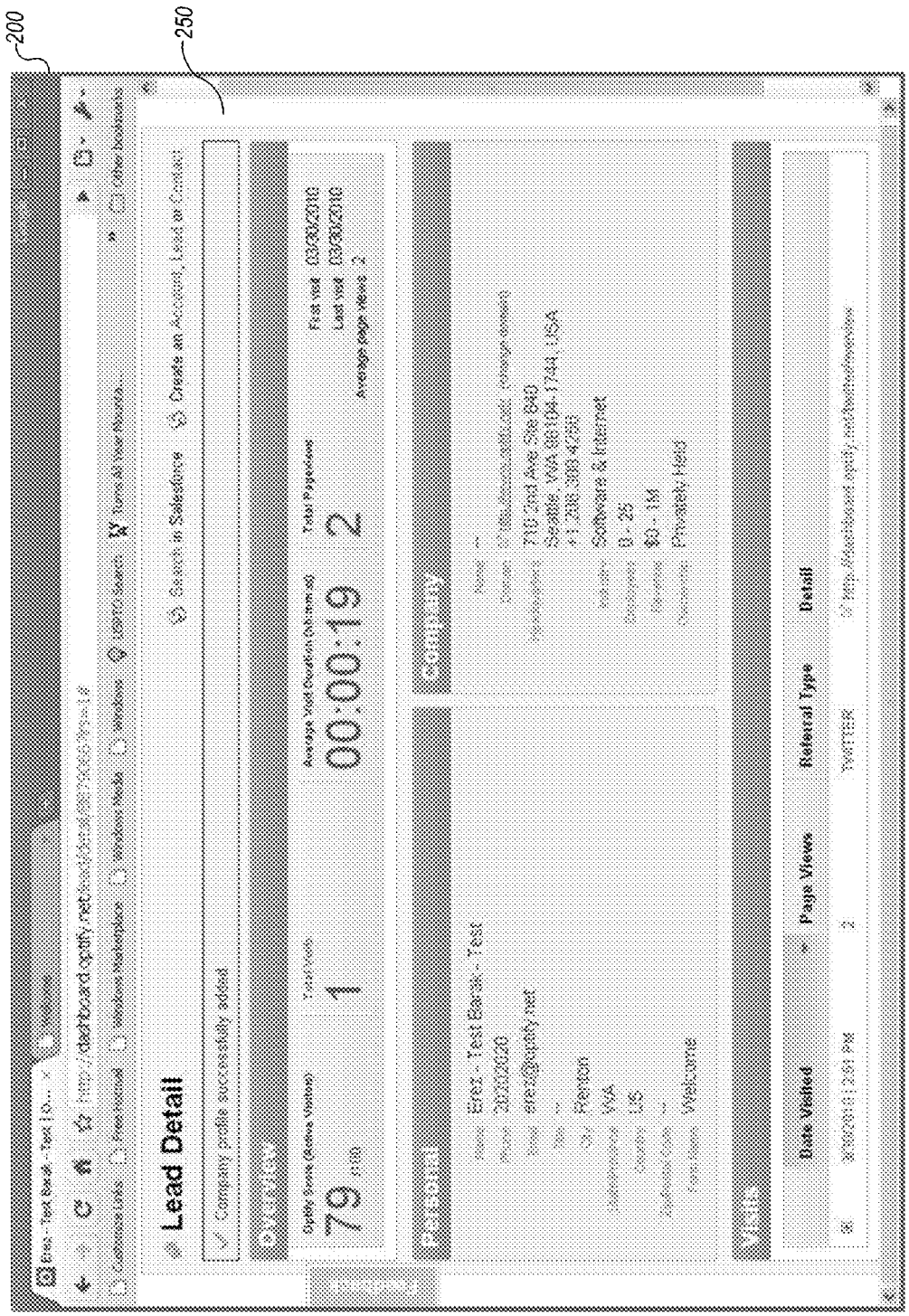

FIG. 2K illustrates an example lead detail report. In particular, FIG. 2K illustrates the Web browser 200 displaying a screen 250 that presents detailed information about a single lead. The presented information includes a lead score, activity information (e.g., total number of visits, average visit duration, total page views), personal information (e.g., name, phone, email), company information (e.g., name, domain, industry). The lead score will be described further with reference to FIG. 2L, below.

The detailed lead information presented via screen 250 is determined by the MASS by aggregating information from various sources, including tracking information gathered by the MASS, marketing information associated with messages sent via the MASS (e.g., campaign identifiers), and personal information about the customer. In at least some embodiments, the aggregated information may also include information obtained from external sources, such as directories (e.g., telephone directories, business directories), social networking services (e.g., information about contacts or friends of a person), a redirection proxy (e.g., provided by a URL shortening service employed by the MASS), a business intelligence service, or the like.

Lead information may be presented in other ways in other embodiments. For example, in some embodiments, periodic emails or other types of messages (e.g., instant messages) may be sent that include updated or recent lead information, such that the recipient of the email can stay apprised of the progress of his current marketing campaign.

Figure 2L:
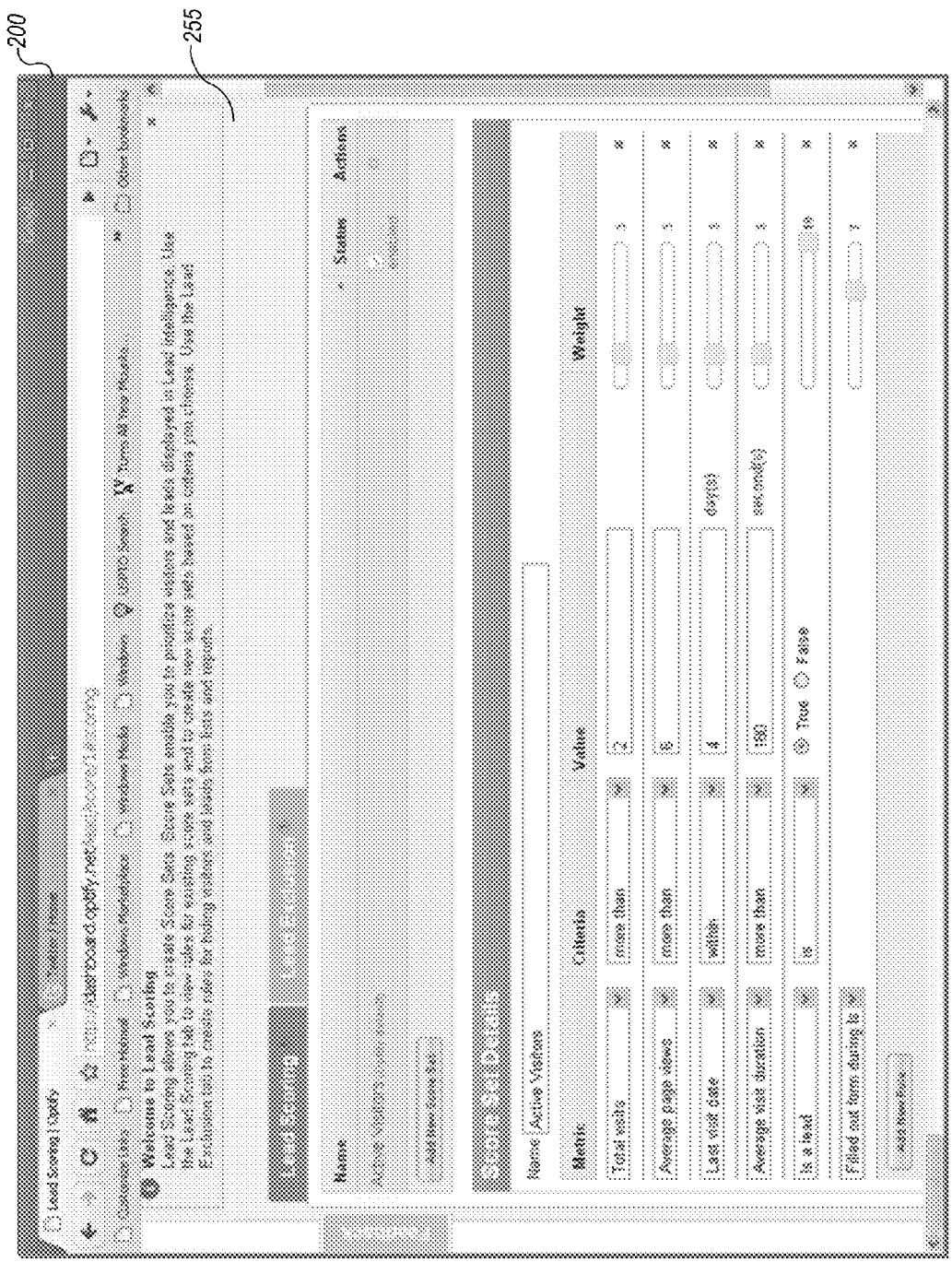

FIG. 2L illustrates an example lead scoring control and definition page. In particular, FIG. 2L illustrates the Web browser 200 displaying a screen 255 that facilitates user control of lead scoring. A lead score a numerical value determined by the MASS for each lead identified by the MASS, based on various factors or attributes of the lead, such as personal information, company information, activity information, and the like. The score can be applied to anonymous visitors as well as leads who have filled in a Web site form. In particular, in some circumstances the MASS may understand and reflect that one or more distinct users have visited a particular Web page, but not yet have any personally identifying information about those users. Even without such personal information, the MASS can still provide valuable intelligence to a user in terms of understanding user traffic or activity patterns with respect to one or more marketing campaigns/messages. The screen 255 includes multiple user interface elements that allow a user to control the determination of a lead score in a fine grained manner. In particular, the user may specify rules that, when matched, result in a number of points being added to a particular lead score. In the illustrated example, the user has specified that the score associated with a lead is to be increased by three when the lead's total visits exceed two; increased by three when the lead's total page views exceed six; increased by three when the lead's last visit date is within four days; increased by three when the lead's average visit duration is longer than 180 seconds; increased by ten when the lead is already known to the MASS as a lead; and increased by seven when the lead fills out a form during the visit.

Lead scoring rules can specify criteria for various attributes of or associated with the lead. For example, attributes related to personal information may include name, title, physical address, email address, telephone or fax numbers, hobbies and interests, financial information (e.g., salary), and the like. Attributes related to company information may include name, physical address, company Web site, number of employees, financial information (e.g., revenue, earnings), industry (e.g., software, health care), and the like. Activity-related attributes may include average page views, average visit duration, last visit date, referring Web page, search keywords, total page views, specific page flow visited, and the like.

Other techniques for lead presentation/scoring are contemplated. For example, in one embodiment, leads can be filtered (e.g., excluded) based on various (possibly user-defined) criteria, including geographic location, domain, company, marketing campaign, or the like. In at least some embodiments the MASS automatically learns user viewing preferences with respect to lead presentation, and can dynamically adjust the presentation of leads by, for example, adjusting lead scoring rules or filtering criteria.

Figure 3:
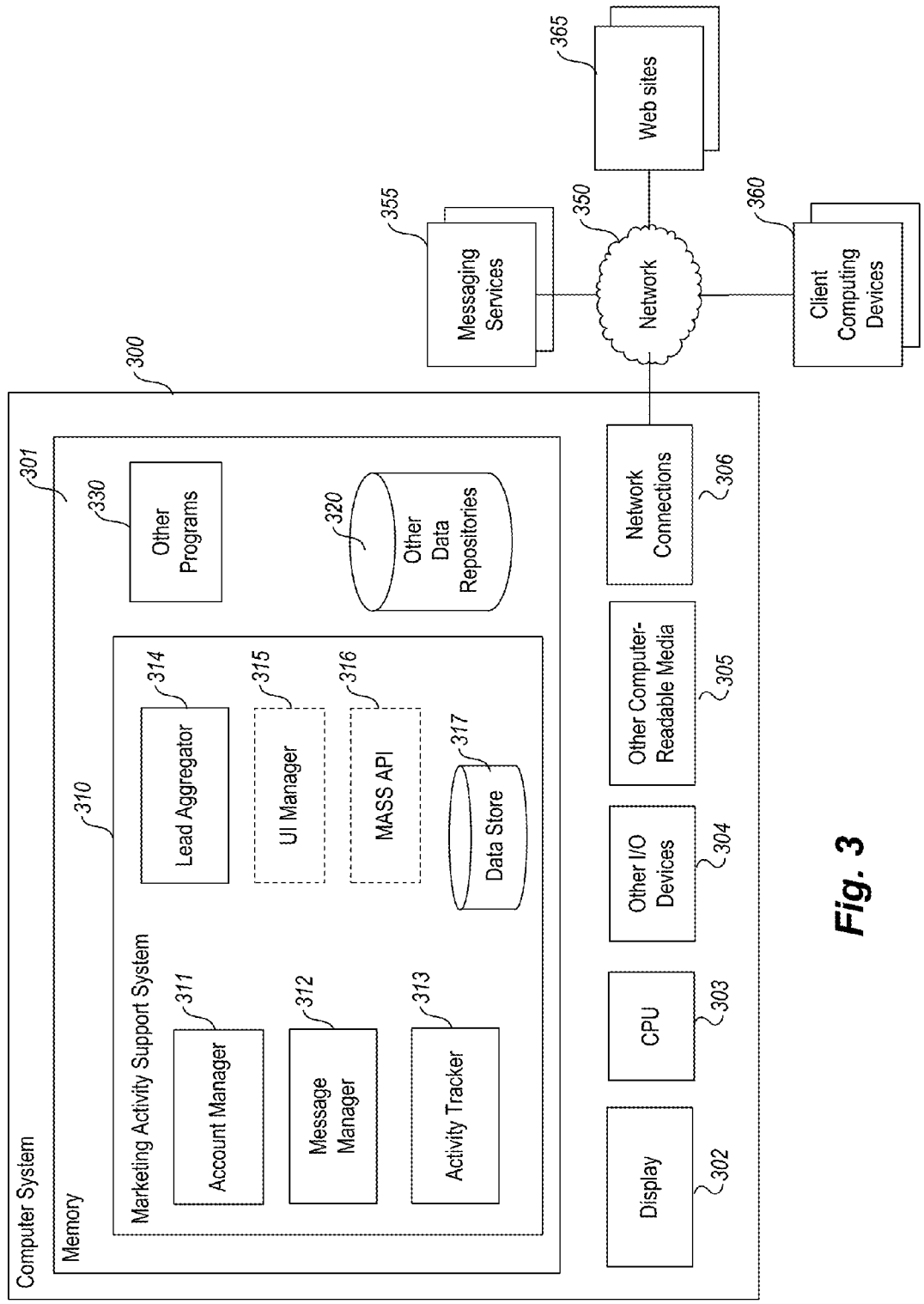
FIG. 3 is an example block diagram of an example computing system for implementing a marketing activity support system according to an example embodiment.

FIG. 3 is an example block diagram of an example computing system for implementing a marketing activity support system according to an example embodiment. In particular, FIG. 3 shows a computing system 300 that may be utilized to implement a marketing activity support system 310 that facilitates marketing activities such as campaign creation, marketing message transmission, and lead generation.

Note that one or more general purpose or special purpose computing systems/devices may be used to implement the marketing activity support system 310. In addition, the computing system 300 may comprise one or more distinct computing systems/devices and may span distributed locations. Furthermore, each block shown may represent one or more such blocks as appropriate to a specific embodiment or may be combined with other blocks. Also, the marketing activity support system 310 may be implemented in software, hardware, firmware, or in some combination to achieve the capabilities described herein.

In the embodiment shown, computing system 300 comprises a computer memory ("memory") 301, a display 302, one or more Central Processing Units ("CPU") 304, Input/Output devices 304 (e.g., keyboard, mouse, CRT or LCD display, and the like), other computer-readable media 305, and network connections 306. The marketing activity support system 310 is shown residing in memory 301. In other embodiments, some portion of the contents, some or all of the components of the marketing activity support system 310 may be stored on and/or transmitted over the other computer-readable media 305. The components of the marketing activity support system 310 preferably execute on one or more CPUs 303 and extract and provide quotations, as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide or include the other computer-readable media 305 or the display 302.

In a typical embodiment, the marketing activity support system 310 includes an account manager 311, a message manager 312, an activity tracker 313, a lead aggregator 314, a user interface manager 315, a marketing activity support system application program interface ("API") 316, and a data store 317. The user interface manager 315 and MASS API 316 are drawn in dashed lines to emphasize that in other embodiments, functions performed by one or more of these components may be performed externally to the marketing activity support system 310. In other embodiments, the marketing activity support system 310 also includes additional modules, such as a URL shortening and/or redirection service.

The account manager 311 performs functions such as those described with reference to the account manager 102 of FIG. 2. The account manager 311 manages account information associated with the MASS 310, such as user names, passwords, account preferences, and the like. The account manager 311 also manages campaign information, by providing functions for campaign creation, deletion, and the like. The information managed by the account manager 311 is stored in the data store 317.

The message manager 312 performs functions such as those described with reference to the message manager 104 of FIG. 2. The message manager 312 facilitates message creation and transmission via one or more messaging services 355. In some embodiments, the message manager 312 may be configured to transmit messages via multiple messaging services 355, including email, Twitter, blog post, instant message, or the like. The message manager 312 is also configured to modify URLs in messages to include tracking identifiers, and possibly to shorten URLs to comply with message size limitations imposed by one or more of the messaging services 355. The message manager 312 may also store information about messages (e.g., message content, transmission date, campaign) in the data store 317.

The activity tracker 313 performs functions such as those described with reference to the activity tracker 106 of FIG. 2. In particular, the activity tracker 313 receives tracking information from various sources and records the received information in the data store 317. For example, the activity tracker 313 may receive tracking information from a Web browser executing on one of the client computing devices 360 and operated by a customer or other potential lead, as the customer access one of the Web sites 365. The activity tracker 313 may also or instead receive tracking information directly from one of the Web sites 365 and/or the messaging services 355. Furthermore, the activity tracker 313 may receive tracking information from a URL shortening service or redirection proxy (not shown), as these services may be employed to redirect and/or translate URLs included in marketing messages transmitted via the marketing activity support system 310.

The lead aggregator 314 performs functions such as those described with reference to the lead aggregator 108 of FIG. 2. The lead aggregator 314 aggregates tracking, personal, and marketing information recorded in the data store 317, such as by the account manager 311, the message manager 312, and/or the activity tracker 313. In addition, the lead aggregator 314 may aggregate information received from other, possibly external sources, including business directories, telephone directories, and the like.

The UI manager 315 provides a view and a controller that facilitate user interaction with the marketing activity support system 310 and its various components. For example, the UI manager 315 may provide interactive access to the marketing activity support system 310, such that users can manage marketing campaigns, create and send marketing messages, and obtain lead intelligence information. In some embodiments, access to the functionality of the UI manager 315 may be provided via a Web server, possibly executing as one of the other programs 330. In such embodiments, a user operating a Web browser executing on one of the client devices 360 can interact with the marketing activity support system 310 via the UI manager 315.

The MASS API 316 provides programmatic access to one or more functions of the marketing activity support system 310. For example, the API 316 may provide a programmatic interface to one or more functions of the marketing activity support system 310 that may be invoked by one of the other programs 330 or some other module. In this manner, the API 316 facilitates the development of third-party software, such as user interfaces, plug-ins, news feeds, adapters (e.g., for integrating functions of the marketing activity support system 310 into Web applications), and the like. In addition, the API 316 may be in at least some embodiments invoked or otherwise accessed via remote entities, such as one of the Web sites 365 and/or client computing devices 360, to access various functions of the marketing activity support system 310. For example, a third-party application may request lead intelligence information from, or provide tracking information to, the marketing activity support system 310 via the API 316.

The data store 317 is used by the other modules of the marketing activity support system 310 to store and/or communicate information. As discussed above, components 311-316 use the data store 317 to record various types of information, including user information, campaign information, marketing messages, tracking information, and the like. Although the components 311-316 are described as communicating primarily through or via the data store 317, other communication mechanisms are contemplated, including message passing, function calls, pipes, sockets, shared memory, and the like.

The marketing activity support system 310 interacts via the network 350 with messaging services 355, Web sites 365, and client computing devices 360. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 360 include desktop computing systems, notebook computers, mobile phones, smart phones, personal digital assistants, and the like.

In an example embodiment, components/modules of the marketing activity support system 310 are implemented using standard programming techniques. For example, the marketing activity support system 310 may be implemented as a "native" executable running on the CPU 303, along with one or more static or dynamic libraries. In other embodiments, the marketing activity support system 310 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the marketing activity support system 310, such as in the data store 317, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 317 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the marketing activity support system 310 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
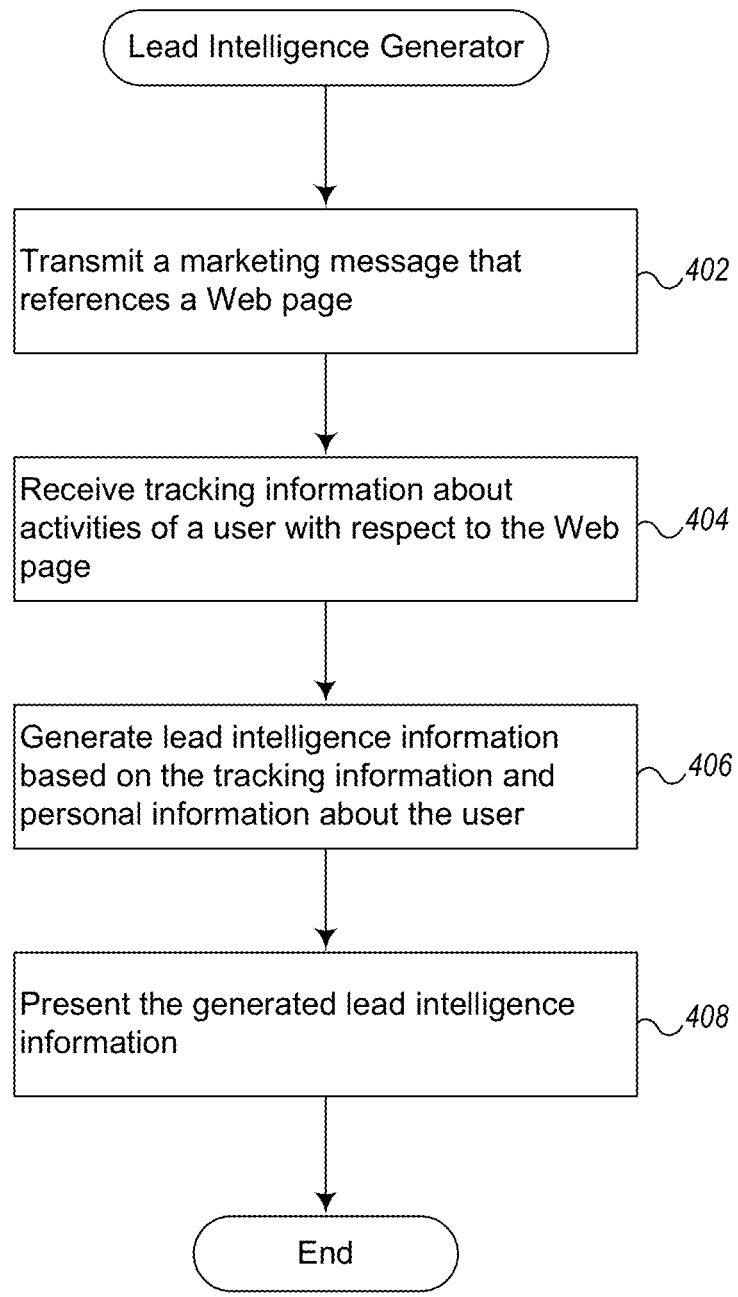
FIG. 4 is an example flow diagram of a lead intelligence generation process performed by a marketing activity support system according to an example embodiment.

FIG. 4 is an example flow diagram of a lead intelligence generation process performed by a marketing activity support system according to an example embodiment. In particular, FIG. 4 illustrates a process that may be implemented by, for example, one or more elements of the marketing activity support system 100 described with reference to FIG. 1. The process generates lead intelligence information by aggregating activity tracking information about an existing or potential customer, personal information about the customer, and/or marketing activity information (e.g., information about a campaign associated with a marketing message).

The illustrated process begins at block 402, where it transmits a marketing message that references a Web page. Transmitting the marketing message may include transmitting the message via a broadcast, direct, or other type of messaging service. The marketing message may reference a Web page by including a URL that identifies the Web page. In other embodiments, other types of content or resources may be reference by the message, including video and/or audio. In some embodiments, the process also modifies the Web page reference (e.g., URL) by including one or more tracking identifiers and/or shortening the reference to comply with message size restrictions or other limits imposed by the underlying messaging service.

At block 404, the process receives tracking information about activities of a user with respect to the Web page. The tracking information may include various details about the activities of the user, such as the time, date, and/or manner in which the user accessed the Web page. The tracking information can be obtained from a Web browser operated by the user to view the Web page, the Web browser executing an activity tracker code module (possibly provided by the marketing activity support system) embedded in or referenced by the Web page.

At block 406, the process generates lead intelligence information based on the tracking information and personal information about the user. Generating lead intelligence information includes aggregating the received tracking information with personal information about the user, such as information provided by the user (e.g., via a Web form on the Web page) or information obtained from other sources (e.g., directories). Generating lead intelligence information may also include aggregating information about the transmitted marketing message, such as a marketing campaign associated with the message, the messaging service used to transmit the message, the time and date of message transmission, and the like.

At block 408, the process presents the generated lead intelligence information. Presenting the generated lead intelligence information may include scoring leads based on various attributes of the leads, such as personal information, company information, activity information, or the like. In some embodiments, lead scoring may be based at least in part on user-specified scoring rules that specify weights and/or values to assign or add to a lead score when criteria match (or do not match) information about a lead.

After block 408, the process ends.

Some embodiments perform one or more operations/aspects in addition to, or instead of, the ones described with reference to the process of FIG. 4. For example, in one embodiment, the process includes a loop that repeatedly transmits messages and generates lead intelligence information based thereon. In other embodiments, the functions are not performed serially as described, but rather in parallel, such as by multiple cooperating modules, processes, threads, or the like. For example, block 402 may be performed by the message manager 104 in response to a received instruction to transmit a message, block 404 may be performed by the activity tracker 106 in response to the receipt of tracking information, block 406 may be performed by the lead aggregator 108 in response to a received user request for lead intelligence information, and so on.

Note also that the MASS API 316 (FIG. 3) or similar component may provide access to or from any of the steps of the process of FIG. 4. For example, the API may be utilized by an external code module to provide a marketing message for transmission by block 402. As another example, the API can be utilized to provide or obtain tracking information discussed with reference to block 404. As a further example, the API can be used to obtain the lead intelligence information generated at block 406.

From the foregoing it will be appreciated that, although specific embodiments have been described herein for purposes of illustration, various modifications may be made without deviating from the spirit and scope of this disclosure. For example, the methods, techniques, and systems for generating lead intelligence information are applicable to other architectures or environments. For example, user/customer activities need not be tracked with respect to static Web pages as shown above, but can be tracked with respect to other types of resources or content, including dynamic content, multimedia (e.g., video/audio), and/or online applications. In addition, in some embodiments, advertisements or marketing messages are obtained from third-party sources. Also, the methods, techniques, and systems discussed herein are applicable to differing languages, protocols, communication media (optical, wireless, cable, etc.) and devices (such as wireless handsets, electronic organizers, personal digital assistants, portable email machines, game machines, pagers, navigation devices such as GPS receivers, etc.).

Appendix A: An Example Activity Tracker Code Module

Table 1, below, is a JavaScript software module that implements one approach to activity tracking used in an example embodiment of a marketing activity support system. The module is loaded and executed by a Web browser when the Web browser loads and/or renders a Web page that is referenced as part of a marketing message, as described above. The module, or similar code, may either be embedded in the Web page, or instead loaded via other code on the Web page, as described with reference to FIG. 2C, above.

In one tracking technique, as shown in lines 65-121, the module causes an executing Web browser to load a small, transparent image from the marketing activity support system. While loading the image, an HTTP cookie is exchanged that provides the marketing activity support system with various tracking information, such as tracking identifiers appended to the URL used to reference the Web page, the referring Web page, the page title, and the like.

In another tracking technique, data from a form on the Web page may be forwarded to the MASS. Form data may be forwarded in a direct or indirect manner. In an example of direct forwarding, the module modifies one or more forms on the Web page to additionally submit form data directly to the marketing activity support system (e.g., via the API 316 of FIG. 3).

In an example of indirect forwarding of form data, the illustrated code module can also be used to modify a form on the Web page to cause the form to report form data to some third party system, such as a system operated by, or associated with, the operator of the Web site that hosts the Web page. This data can then be transmitted by that system via an API (e.g., the API 316 of FIG. 3) to the MASS. In some embodiments, the data is forwarded to the MASS in substantially real time in response to a user filling out the form. In other embodiments, data may be forwarded at later times. For example, in one embodiment, a delivery schedule may be specified, such that form data is "batched" up and forwarded to the MASS at regular intervals (e.g., hourly, daily). In other embodiments, other types of triggers may be specified, including that the form data be forwarded when a certain number of form entries (e.g., by N distinct users) have been made or a certain amount of form data has been accumulated.

TABLE 1

| Line No. | Source |
|---|---|
| 1 | var _opt = new (function( ) { /* Copyright 2009 Optify Inc. */ |
| 2 | |
| 3 | var CHARS = |
| 4 | '0123456789ABCDEFGHIJKLMNOPQRSTUVWXYZabcdefghijklmnopqrstuvwxyz'. split(''); |
| 5 | |
| 6 | function generateUuid(len, radix) { |
| 7 | var chars = CHARS, uuid = [ ], rnd = Math.random; |
| 8 | radix = radix || chars.length; |
| 9 | |
| 10 | if (len) { |
| 11 | // Compact form |
| 12 | for ( var k = 0; k < len; k++) { |
| 13 | uuid[k] = chars[0 | rnd( ) * radix]; |
| 14 | } |
| 15 | } |
| 16 | else { |
| 17 | var r; |
| 18 | uuid[8] = uuid[13] = uuid[18] = uuid[23] = '-'; |
| 19 | uuid[14] = '4'; |
| 20 | for ( var i = 0; i < 36; i++) { |
| 21 | if (!uuid[i]) { |
| 22 | r = 0 | rnd( ) * 16; |
| 23 | uuid[i] = chars[(i == 19) ? (r & 0x3) | 0x8 : r & 0xf]; |
| 24 | } |
| 25 | } |
| 26 | } |
| 27 | return uuid.join(''); |
| 28 | } |
| 29 | |
| 30 | var cid = ""; |
| 31 | var doc = document; |
| 32 | var doc_title = doc.title; |
| 33 | var serviceUrl = "service.optify.net"; |
| 34 | |

TABLE 1-continued

| Line No. | Source |
|---|---|
| 35 | try { |
| 36 |   if(window.serviceUrlOverride) { |
| 37 |     serviceUrl = window.serviceUrlOverride; |
| 38 |   } |
| 39 | } catch(err) { } |
| 40 | |
| 41 | var pageProtocol = window.location.protocol + "//"; |
| 42 | var trackURL = pageProtocol + serviceUrl + "/visit/ping"; |
| 43 | var formURL = pageProtocol + serviceUrl + "/form/submit"; |
| 44 | var visitorId; |
| 45 | var visitId; |
| 46 | // cookie names |
| 47 | var visitorName = "_opt_vi"; |
| 48 | var vsessionName = "_opt_vs"; |
| 49 | var vtimedName = "_opt_vt"; |
| 50 | var vtimed_time = 120; |
| 51 | // roll back form action change (if applied) |
| 52 | // if tracking pixel does not load |
| 53 | function imgOnError( ) { |
| 54 |   var _forms = document.getElementsByTagName('form'); |
| 55 |   for (var i = 0; i < _forms.length; i++) { |
| 56 |     var _form = _forms[i]; |
| 57 |     var _originalActionElement = _form.elements["_orig_action"]; |
| 58 | |
| 59 |     if(_originalActionElement && _originalActionElement.value) { |
| 60 |       _form.action = _originalActionElement.value; |
| 61 |     } |
| 62 |   } |
| 63 | } |
| 64 | |
| 65 | this.view = function(c_token) { |
| 66 |   if (c_token === undefined || c_token === '') { |
| 67 |     return; |
| 68 |   } |
| 69 | |
| 70 |   cid = c_token; |
| 71 | |
| 72 |   var _ref = "&ref=" + getReferrer( ); |
| 73 |   var _title = "&title=" + encodeURIComponent(doc_title); |
| 74 |   var _visitorId = "&visitorId=" + visitorId; |
| 75 |   var _url = "&url=" + encodeURIComponent(document.location.href); |
| 76 |   var _cid = "?cId=" + cid; |
| 77 |   var _optify_ref_old = getQueryVariable("optify_r"); |
| 78 |   var _optify_ref_title_old = getQueryVariable("optify_rd"); |
| 79 |   var _optify_ref_new = getQueryVariable("_opt_r"); |
| 80 |   var _optify_ref_title_new = getQueryVariable("_opt_rd"); |
| 81 |   var _optify_ref_title_id = getQueryVariable("_opt_rdid"); |
| 82 |   var _optify_ref = (_optify_ref_new && _optify_ref_new !== "") ? |
| 83 |   _optify_ref_new : _optify_ref_old; |
| 84 |   var _optify_ref_title = |
| 85 |   (_optify_ref_title_new && _optify_ref_title_new !== "") ? |
| 86 |   _optify_ref_title_new : _optify_ref_title_old; |
| 87 | |
| 88 |   trackURL += _cid + _visitorId + _ref + _title + _url + '&' + |
| 89 |   Math.random( ); |
| 90 | |
| 91 |   if(_optify_ref && _optify_ref !== "") { |
| 92 |     trackURL += "&_opt_r=" + _optify_ref; |
| 93 |   } |
| 94 |   if(_optify_ref_title && _optify_ref_title !== "") { |
| 95 |     trackURL += "&_opt_rd=" + _optify_ref_title; |
| 96 |   } |
| 97 |   if (_optify_ref_title_id && _optify_ref_title_id !== ""){ |
| 98 |     trackURL += "&_opt_rdid=" + _optify_ref_title_id; |
| 99 |   } |
| 100 | |
| 101 |   setVisitorCookie( ); |
| 102 | |
| 103 |   var vsession = getCookie(vsessionName); |
| 104 |   var vtimed = getCookie(vtimedName); |
| 105 |   visitId = vtimed; |
| 106 |   if (vsession === undefined || vsession === null || |
| 107 |       vtimed === undefined || vtimed === null) { |
| 108 |     visitId = generateUuid(10, 16); |
| 109 |     setVisitSessionCookie( ); |
| 110 |   } |
| 111 | |

TABLE 1-continued

| Line No. | Source |
|---|---|
| 112 | setVisitTimedCookie(visitId); |
| 113 | |
| 114 | trackURL += "&visitId=" + visitId; |
| 115 | |
| 116 | var trackingPixel = new Image(1,1); |
| 117 | trackingPixel.src = trackURL; |
| 118 | trackingPixel.onerror = imgOnError; |
| 119 | |
| 120 | modifyForms( ); |
| 121 | }; |
| 122 | |
| 123 | function getQueryVariable(variable) { |
| 124 | var query = window.location.search.substring(1); |
| 125 | var vars = query.split("&"); |
| 126 | for ( var i = 0; i < vars.length; i++) { |
| 127 | var pair = vars[i].split("="); |
| 128 | if (pair[0] == variable) { |
| 129 | return pair[1]; |
| 130 | } |
| 131 | } |
| 132 | } |
| 133 | |
| 134 | function getGUID( ) { |
| 135 | visitorId = getCookie(visitorName); |
| 136 | if (visitorId === undefined || visitorId === "" || |
| 137 | visitorId === null || visitorId === "null") { |
| 138 | visitorId = genCookieID( ); |
| 139 | } |
| 140 | } |
| 141 | |
| 142 | function genCookieID( ) { |
| 143 | return generateUuid( ); |
| 144 | } |
| 145 | |
| 146 | function setCookie(name, value, expires, path) { |
| 147 | var domain = getDomain( ); |
| 148 | document.cookie = name + "=" + value + |
| 149 | ((expires) ? ";expires=" + expires : "") + |
| 150 | ((path) ? ";path=" + path : ";path=/") + |
| 151 | ((domain) ? ";domain=." + domain : ""); |
| 152 | } |
| 153 | |
| 154 | function setVisitorCookie( ) { |
| 155 | var date = new Date(2020, 1, 1); |
| 156 | setCookie(visitorName, encodeURIComponent(visitorId), |
| 157 | date.toGMTString( )); |
| 158 | } |
| 159 | |
| 160 | function setVisitSessionCookie( ) { |
| 161 | setCookie(vsessionName, encodeURIComponent(visitorId)); |
| 162 | } |
| 163 | |
| 164 | function setVisitTimedCookie(previousVisitId) { |
| 165 | var date = new Date( ); |
| 166 | date.setMinutes(date.getMinutes( ) + vtimed_time); |
| 167 | setCookie(vtimedName, encodeURIComponent(previousVisitId), |
| 168 | date.toGMTString( )); |
| 169 | } |
| 170 | |
| 171 | function getCookie(name) { |
| 172 | var dc = document.cookie; |
| 173 | var prefix = name + "="; |
| 174 | var begin = dc.indexOf("; " + prefix); |
| 175 | if (begin == −1) { |
| 176 | begin = dc.indexOf(prefix); |
| 177 | if (begin !== 0) { |
| 178 | return null; |
| 179 | } |
| 180 | } |
| 181 | else { |
| 182 | begin += 2; |
| 183 | } |
| 184 | var end = document.cookie.indexOf(";", begin); |
| 185 | if (end == −1) { |
| 186 | end = dc.length; |
| 187 | } |
| 188 | return decodeURIComponent(dc.substring(begin + prefix.length, end)); |

TABLE 1-continued

| Line No. | Source |
|---|---|
| 189 | `}` |
| 190 | |
| 191 | `function getDomain( ) {` |
| 192 | `  var domainSuffixes = "aero;arpa;biz;cat;co;coop;com;edu;" +` |
| 193 | `     "gov;info;int;jobs;mil;mobi;museum;name;net;org;pro;travel;";` |
| 194 | `  var domain = document.domain;` |
| 195 | `  var temp = domain.split('.');` |
| 196 | `  if ((/^\d{1,3}\.\d{1,3}\.\d{1,3}\.\d{1,3}$/).test(domain)) {` |
| 197 | `    return domain;` |
| 198 | `  } else if (temp.length == 1) {` |
| 199 | `    return null;` |
| 200 | `  } else {` |
| 201 | `    var d = "";` |
| 202 | `    var i = 0;` |
| 203 | `    while (1 < 2) {` |
| 204 | `      i++;` |
| 205 | `      var suffix = temp[temp.length − i];` |
| 206 | `      d = suffix + (i > 1 ? "." : "") + d;` |
| 207 | `      if (domainSuffixes.indexOf(suffix + ";") != −1) {` |
| 208 | `        d = temp[temp.length − i − 1] + "." + d;` |
| 209 | `        break;` |
| 210 | `      }` |
| 211 | `    }` |
| 212 | `    return d;` |
| 213 | `  }` |
| 214 | `}` |
| 215 | |
| 216 | `function getReferrer( ) {` |
| 217 | `  var ref = encodeURIComponent(doc.referrer);` |
| 218 | `  if (ref === undefined || ref === '') {` |
| 219 | `    return '';` |
| 220 | `  }` |
| 221 | `  return ref;` |
| 222 | `}` |
| 223 | |
| 224 | `function addHiddenField(_form, field_name, field_value) {` |
| 225 | `  var element = null;` |
| 226 | `  var type = "input";` |
| 227 | |
| 228 | `  // Attempt to create element using IE < 8 style` |
| 229 | `  try {` |
| 230 | `    element = document.createElement('<' + type + ' name="' +` |
| 231 | `      field_name + '" type="hidden"/>');` |
| 232 | `  } catch (e) {}` |
| 233 | |
| 234 | `  // Normal browsers` |
| 235 | `  if (!element || element.nodeName != type.toUpperCase( )) {` |
| 236 | `    element = document.createElement(type);` |
| 237 | `    element.type = 'hidden';` |
| 238 | `    element.name = field_name;` |
| 239 | `  }` |
| 240 | |
| 241 | `  element.value = field_value;` |
| 242 | `  _form.appendChild(element);` |
| 243 | `}` |
| 244 | |
| 245 | `function modifyForms( ) {` |
| 246 | `  var _forms = document.getElementsByTagName('form');` |
| 247 | `  for (var i = 0; i < _forms.length; i++) {` |
| 248 | `    var _form = _forms[i];` |
| 249 | |
| 250 | `    var canModify = false;` |
| 251 | `    var canChangeAction = false;` |
| 252 | |
| 253 | `    var action = _form.getAttribute('action');` |
| 254 | `    var _optify_submit = _form.getAttribute('optify_submit');` |
| 255 | `    var _optify_modify = _form.getAttribute('optify_modify');` |
| 256 | |
| 257 | `    if (action && action.indexOf &&` |
| 258 | `   (action.indexOf('http://www.salesforce.com/servlet/servlet.WebToLead')` |
| 259 | `     != −1 ||` |
| 260 | `action.indexOf('https://www.salesforce.com/servlet/servlet.WebToLead')` |
| 261 | `     != −1)) {` |
| 262 | `      canModify = true;` |
| 263 | `      canChangeAction = true;` |
| 264 | `    }` |
| 265 | `    else if(_optify_submit && _optify_submit.toLowerCase( ) === "true")` |

TABLE 1-continued

| Line No. | Source |
|---|---|
| 266 | { |
| 267 | canModify = true; |
| 268 | canChangeAction = true; |
| 269 | } |
| 270 | else if(_optify_modify && _optify_modify.toLowerCase( ) === "true") |
| 271 | { |
| 272 | canModify = true; |
| 273 | canChangeAction = false; |
| 274 | } |
| 275 | for (var j = 0; j < _form.elements.length; j++) { |
| 276 | var _element = _form.elements[j]; |
| 277 | var _elementClass = _element.className; |
| 278 | if(_elementClass && _elementClass === "optify_vid") { |
| 279 | element.value = visitorId; |
| 280 | canModify = true; |
| 281 | break; |
| 282 | } |
| 283 | } |
| 284 | if(canModify) { |
| 285 | addHiddenField(_form, "_orig_action", _form.action); |
| 286 | addHiddenField(_form, "_opt_vid", visitorId); |
| 287 | addHiddenField(_form, "_opt_visit", visitId); |
| 288 | addHiddenField(_form, "_opt_cid", cid); |
| 289 | addHiddenField(_form, "_opt_url", document.location.href); |
| 290 | addHiddenField(_form, "_opt_paget", document.title); |
| 291 | } |
| 292 | if(canChangeAction) { |
| 293 | _form.action = formURL; |
| 294 | } |
| 295 | } |
| 296 | } |
| 297 | |
| 298 | getGUID( ); |
| | })( ); |

What is claimed is:

1. A method of tracking leads in a marketing activity support system, the method being implemented by one or more processors and comprising:
receiving, from a user of the marketing activity support system, a marketing message in a message manager on a server, wherein the marketing message is associated with a marketing campaign of the user and the marketing message comprises (1) a marketing statement, and (2) a uniform resource locator that identifies a web page for the marketing campaign;
modifying the uniform resource locator in the message manager to include a tracking identifier that identifies the marketing campaign of the user, wherein modifying the uniform resource locator includes shortening the modified resource locator, such that the marketing message complies with a selected maximum message size;
transmitting the marketing message, including the marketing statement and the modified uniform resource locator, via a messaging service that places a restriction upon maximum message size, wherein the marketing message is transmitted via the messaging service by using stored account credentials for the messaging service supplied by the user, and wherein the selected maximum message size complies with at least one of the restriction upon maximum message size or other message limits;
receiving an access indication, based on the tracking identifier, that the web page was accessed by a lead via the modified uniform resource locator;
receiving tracking information at the server, the tracking information including activities of the lead with respect to the web page identified in the marketing message, wherein receiving the tracking information includes receiving, from a web browser on a client device of the lead, one or more Hypertext Transfer Protocol cookies that include one or more name-value pairs that represent the tracking information, and wherein the tracking information identifies the messaging service and the marketing campaign;
aggregating the received tracking information based on the messaging service and the marketing campaign; and
providing a presentation of the aggregated tracking information, broken out by the messaging service and the marketing campaign, for display on a display on a display device of the user.

2. The method of claim 1, wherein modifying the uniform resource locator comprises submitting the uniform resource locator with the tracking identifier to a URL shortening service that generates the modified uniform resource locator.

3. The method of claim 2, wherein the modified uniform resource locator directs the web browser of the lead to the URL shortening service, and the URL shortening service redirects the web browser to the web page including the tracking identifier.

4. The method of claim 1, further comprising:
generating marketing lead intelligence information including the received access indication, received tracking information, personal information about the lead, and information associated with the marketing message; and
providing a presentation of the generated marketing lead intelligence information by a lead aggregator, the presentation including a lead activity report regarding the lead and including a visual display of an activity pattern and progress for the lead from initial detected interaction and a lead score, the lead activity report for display on the display device of the user.

5. The method of claim 4, further comprising:
determining the lead score for the generated marketing lead intelligence information for each of multiple distinct leads, wherein the lead aggregator on the server determines the lead score for the generated marketing lead intelligence information, the lead scores based on personal information about each of the multiple distinct leads, company information associated with each of the multiple distinct leads, and activity tracking information about each of the multiple distinct leads.

6. The method of claim 5, wherein determining the lead scores for each of the multiple distinct leads is based on one or more user-specified rules that adjust the lead score based on whether rule criteria match information about the lead.

7. The method of claim 1, wherein receiving the access indication that the web page was accessed includes receiving, from the web browser of the lead, personal information about the lead and information about the lead's activity on the web page, the personal information including information provided by the lead via a form on the web page.

8. The method of claim 1, wherein transmitting the marketing message includes transmitting the marketing message via a direct messaging service which provides for delivery of messages to known recipient leads.

9. The method of claim 1, wherein transmitting the marketing message includes transmitting the marketing message by at least one of email, text message, or a multimedia message.

10. The method of claim 1, wherein transmitting the marketing message includes transmitting the marketing message via a broadcast messaging service which does not provide identity information about recipients of messages transmitted by the broadcast messaging service.

11. The method of claim 1, wherein transmitting the marketing message includes transmitting the marketing message by at least one of a micro-blogging service, a blog service, a web page posting, or a status update to a social networking account.

12. The method of claim 1, further comprising:
providing a code module for incorporation into the web page from the message manager, the code module configured, when executed by the web browser of the lead, to transmit the tracking information.

13. A marketing activity support system, comprising:
one or more processors; and
one or more hardware memory resources storing instructions that, when executed by the one or more processors, cause the marketing activity support system to:
receive, from a user of the marketing activity support system, a marketing message in a message manager on a server, wherein the marketing message is associated with a marketing campaign of the user and the marketing message comprises (1) a marketing statement, and (2) a uniform resource locator that identifies a web page for the marketing campaign;
modify the uniform resource locator in the message manager to include a tracking identifier that identifies the marketing campaign of the user, wherein modifying the uniform resource locator includes shortening the modified resource locator, such that the marketing message complies with a selected maximum message size;
transmit the marketing message, including the marketing statement and the modified uniform resource locator, via a messaging service that places a restriction upon maximum message size, wherein the marketing message is transmitted via the messaging service by using stored account credentials for the messaging service supplied by the user, and wherein the selected maximum message size complies with at least one of the restriction upon maximum message size or other message limits;
receive an access indication, based on the tracking identifier, that the web page was accessed by a lead via the modified uniform resource locator;
receive tracking information at the server, the tracking information including activities of the lead with respect to the web page identified in the marketing message, wherein receiving the tracking information includes receiving, from a web browser on a client device of the lead, one or more Hypertext Transfer Protocol cookies that include one or more name-value pairs that represent the tracking information, and wherein the tracking information identifies the messaging service and the marketing campaign;
aggregate the received tracking information based on the messaging service and the marketing campaign; and
provide a presentation of the aggregated tracking information, broken out by the messaging service and the marketing campaign, for display on a display on a display device of the user.

14. The marketing activity support system of claim 13, wherein modifying the uniform resource locator comprises submitting the uniform resource locator with the tracking identifier to a URL shortening service that generates the modified uniform resource locator.

15. The marketing activity support system of claim 14, wherein the modified uniform resource locator directs the web browser of the lead to the URL shortening service, and the URL shortening service redirects the web browser of the lead to the web page including the tracking identifier.

16. A non-transitory computer-readable medium that stores instructions, executable by one or more processors, to cause the one or more processors to perform operations that comprise:
receiving, from a user of a marketing activity support system, a marketing message in a message manager on a server, wherein the marketing message is associated with a marketing campaign of the user and the marketing message comprises (1) a marketing statement, and (2) a uniform resource locator that identifies a web page for the marketing campaign;
modifying the uniform resource locator in the message manager to include a tracking identifier that identifies the marketing campaign of the user, wherein modifying the uniform resource locator includes shortening the modified resource locator, such that the marketing message complies with a selected maximum message size;
transmitting the marketing message, including the marketing statement and the modified uniform resource locator, via a messaging service that places a restriction upon maximum message size, wherein the marketing message is transmitted via the messaging service by using stored account credentials for the messaging service supplied by the user, and wherein the selected maximum message size complies with at least one of the restriction upon maximum message size or other message limits;

receiving an access indication, based on the tracking identifier, that the web page was accessed by a lead via the modified uniform resource locator;

receiving tracking information at the server, the tracking information including activities of the lead with respect to the web page identified in the marketing message, wherein receiving the tracking information includes receiving, from a web browser on a client device of the lead, one or more Hypertext Transfer Protocol cookies that include one or more name-value pairs that represent the tracking information, and wherein the tracking information identifies the messaging service and the marketing campaign;

aggregating the received tracking information based on the messaging service and the marketing campaign; and providing a presentation of the aggregated tracking information, broken out by the messaging service and the marketing campaign, for display on a display on a display device of the user.

* * * * *